(12) United States Patent
Watanabe et al.

(10) Patent No.: US 8,134,905 B2
(45) Date of Patent: Mar. 13, 2012

(54) INFORMATION STORAGE DEVICE AND STORAGE MEDIA

(75) Inventors: Takao Watanabe, Fuchu (JP); Toshimichi Shintani, Kodaira (JP); Takeshi Maeda, Koganei (JP); Akemi Hirotsune, Odawara (JP); Tomonori Sekiguchi, Tama (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 12/261,032

(22) Filed: Oct. 30, 2008

(65) Prior Publication Data

US 2009/0116363 A1    May 7, 2009

(30) Foreign Application Priority Data

Nov. 1, 2007 (JP) .................. 2007-284665

(51) Int. Cl.
*G11B 7/00* (2006.01)

(52) U.S. Cl. .............. 369/101; 369/112.01; 369/112.27; 369/103

(58) Field of Classification Search .................. 369/101, 369/103, 112.01, 112.27
See application file for complete search history.

(56) References Cited

U.S. PATENT DOCUMENTS

| 5,844,700 | A * | 12/1998 | Jeganathan et al. | 359/7 |
| 6,900,914 | B1 * | 5/2005 | Tanaka et al. | 359/35 |
| 7,006,425 | B1 * | 2/2006 | Hirao et al. | 369/111 |
| 7,907,765 | B2 * | 3/2011 | Fauver et al. | 382/131 |
| 2002/0141625 | A1 | 10/2002 | Nelson | |

FOREIGN PATENT DOCUMENTS

| JP | 06-076374 A | 3/1994 |
| JP | 09-069240 A | 3/1997 |
| JP | 11-337756 A | 12/1999 |
| JP | 2000-228014 A | 8/2000 |
| JP | 2006-031894 A | 2/2006 |
| JP | 2006-509197 A | 3/2006 |
| JP | 2007-102878 A | 4/2007 |

OTHER PUBLICATIONS

Azriel Rosenfeld and Avinash C. Kak, Digital Picture Processing, Second Edition, vol. 1, Academic Press Inc., Chapter 8, pp. 353 to 430.
Office Action issued May 31, 2011 in Japanese Patent Application No. 2007-284665.

* cited by examiner

*Primary Examiner* — Adam R Giesy
(74) *Attorney, Agent, or Firm* — Miles and Stockbridge P.C.

(57) ABSTRACT

In an information memory apparatus having minute areas for storing information arranged in x, y and z directions three-dimensionally, parallel rays are irradiated to a memory area MA in a direction perpendicular to a z-axis to take projection images of the memory area MA while rotating the memory area MA around the z-axis little by little. The light rays irradiated at this time have a size which covers at least a direction of an x-y plane of the memory area. A computation unit PU finds data and addresses of minute areas distributed three-dimensionally by performing computation based upon the principle of computer tomography on the projection images. As for data writing, a change is given to optical transmissivity or light emission characteristics by irradiating laser light focused by a lens OL placed outside the memory area to a desired minute area and causing heat denaturation within the pertinent minute area.

17 Claims, 18 Drawing Sheets

ΔW1

MASK1

ΔW2

MASK2

INFORMATION STORAGE DEVICE AND STORAGE MEDIA

INCORPORATION BY REFERENCE

The present application claims priority from Japanese application JP2007-284665 filed on Nov. 1, 2007, the content of which is hereby incorporated by reference into this application.

BACKGROUND OF THE INVENTION

The present invention relates to an information memory apparatus and in particular to a memory apparatus suitable for storing information in a three-dimensional form.

Devices which handle digital information such as images and voices have made rapid advances in performance improvement. In keeping therewith, information memory apparatuses have also made great advances. As representative information memory apparatuses, there are semiconductor memories, hard disks and optical disks. They are basically obtained by arranging information storing elements in a two-dimensional form. Higher integration and lower cost of them have been made mainly relying upon advance of the microprocessing technology. However, it has also become gradually difficult to make the processing technology micro. It is said that promoting higher integration and lower costs rapidly as in the past is not easy hereafter.

It is conceivable to arrange memory elements not in a two-dimensional form but in a three-dimensional form, as means for solving this problem. Its example is described in the following papers.

A multilayer waveguide type read only memory card obtained by stacking planar optical waveguides as multiple layers is described in JP-A-11-337756.

A memory apparatus which uses cylindrical glass or plastics as a memory medium and reads information by using the computer tomography technology is described in JP-A-06-076374.

Details concerning the principle of the computer tomography technology are described in Digital Picture Processing, Second Edition, Volume 1, Azriel Rosenfeld and Avinash C. Kak, Academic Press Inc., Chapter 8, pp. 353 to 430.

A shape of a memory medium obtained by rolling a sheetlike medium into a cylindrical shape is shown in FIG. 6 in JP-A-2006-31894.

SUMMARY OF THE INVENTION

Examples of the multilayer waveguide read only memory card obtained by stacking planar optical waveguides in a multilayer form are described in JP-A-11-337756. The side face of each layer is cut with an inclination of 45 degrees to a normal of a waveguide plane. Furthermore, the cut faces of the layers are deviated so as to prevent the cut faces from overlapping each other when viewed from the direction of the normal. If light from the normal side (i.e., the top face of the stacked waveguide planes) is applied to the cut face of a layer to be selected, therefore, the light is reflected at the cut face and incident on the waveguide plane of the selected layer. The light incident on the selected waveguide plane is dispersed by unevenness formed in the waveguide. The occurrence location of the dispersed light is read as a two-dimensional pattern by using a lens and a two-dimensional light-sensor device. In this scheme, the pattern of dispersed light from a selected layer can be read by aligning the focal point of the lens with the selected cut face.

If a layer which is far from the light-sensor device is selected, however, the dispersed light passes through layers which are not selected and consequently absorption of light in the unselected layers and dispersion of light by the unevenness are caused. The influence of the dispersion does not pose a serious problem when the number of layers is small. If the number of layers increases, however, the strength of dispersed light from the selected layer is decreased by the light absorption whereas the influence of light dispersion in the unselected layers becomes great. Therefore, there is a possibility that the signal-to-noise ratio in the light-sensor device will be lowered and the signal readout cannot be conducted.

An embodiment using a cylindrical medium of glass or plastics is described in JP-A-06-076374. Small divisions which differ in optical transmissivity are provided within the medium in a three-dimensional form to store information. Concrete description concerning how optical transmissivity in the small divisions is changed, i.e., how information is written is not found. As regards readout, the following method is described.

A laser beam is incident in the diameter direction of the cylindrical medium, and its strength is measured by a light-sensor part placed on the opposite side. And the cylindrical medium is rotated around its center axis and the transmissivity is measured. Here, the center axis means an axis passing the center of the circle of the cylindrical medium. Transmissivity of each of small divisions distributed in the sectional circle is found by conducting computation processing on the basis of data of transmitted light measured during one revolution. Information stored within the cylinder is described to be read by conducting the work while moving the cylinder in the rotation axis direction. In the embodiment described in JP-A-06-076374, the laser beam is incident in the diameter direction of the cylinder and consequently the problem that the signal-to-noise ratio of the signal is lowered when the length in the rotation axis direction of the cylinder is prolonged is not posed.

In the configuration of the embodiment described in JP-A-06-076374, however, transmissivity of every small division distributed within the sectional circle cannot be found by the computation. This is because a light emission part and the light-sensor part of the laser beam are disposed in the diameter direction of the cylinder. In this case, only the transmissivity in the diameter direction is measured even if the cylinder is caused to make one revolution. As well known, not only information on a line in the diameter direction passing through the center but also transmissivity values on a large number of lines parallel to that line are needed in the computer tomography for finding the sectional structure by computation. In the configuration described in JP-A-06-076374, therefore, the data distributed in the cylindrical medium in the three-dimensional form cannot be read accurately. The principle of the computer tomography is described in the aforementioned paper written by Rosenfeld et al.

Although not described in JP-A-06-076374, it is also conceivable to cause the laser beam to be incident with a shift from the center of the cylindrical medium in order to find the sectional structure by using the computer tomography technology.

In the configuration described in JP-A-06-076374, the medium is cylindrical and the incident light is a laser beam. Even if it is attempted to measure the transmissivity of a light ray parallel to the diameter needed in the computer tomography, however, there is a possibility that a light path will be bent greatly at the surface of the cylinder because of refraction of light and consequently accurate information will not be obtained when the laser beam is incident on a place which is far from the center.

From the foregoing description, there is a possibility that it will be impossible to obtain accurate sectional information by applying the principle of the computer tomography in the embodiment described in JP-A-06-076374 or in a range which can be analogized easily from it. In addition, a method for writing data into the memory medium is not described in JP-A-06-076374.

The present invention has been made in view of these problems. The above-described and other objects and novel features of the present invention will be made clear from description and accompanying drawings of the present invention.

Representative aspects of the invention disclosed in the present specification will now be described.

First, an information memory apparatus is configured to include an illumination unit having a light source, a memory unit including a memory medium, the memory medium having a memory area, a plurality of memory cells being arranged in the memory area, each of the memory cells storing data using a difference in transmissivity for light rays irradiated from the illumination unit or a difference caused in light emission characteristics when light rays irradiated from the illumination unit have been received, a reading unit having an imaging device to take an image of light rays incident via the memory medium, and a computation unit for analyzing data obtained by taking an image in the reading unit, wherein light rays irradiated from the illumination unit has a width covering the memory area in the memory medium in a direction of a third axis perpendicular to a first axis coupling the illumination unit and the reading unit and a rotation axis of the memory medium.

An information memory apparatus may be configured to include an illumination unit having a light source, a memory unit including a memory medium, the memory medium having a memory area, a plurality of memory cells being arranged in the memory area, each of the memory cells storing data using a difference in transmissivity for light rays irradiated from the illumination unit or a difference caused in light emission characteristics when light rays irradiated from the illumination unit have been received, a reading unit having an imaging device to take an image of light rays incident via the memory medium, and a computation unit for analyzing data obtained by taking an image in the reading unit, wherein a width of the light rays irradiated from the illumination unit in the memory medium in a direction of a third axis is smaller than a size of the memory medium in the direction of the third axis, and a rotation axis of the memory medium deviates from a center axis of the memory medium on a plane formed by a first axis and the third axis.

In addition, a memory medium is configured to include a plurality of flat plates on which a plurality of memory cells are formed, each of the memory cells storing data using a difference in transmissivity for light rays irradiated from external or a difference caused in light emission characteristics when light rays irradiated from the external have been received, wherein the flat plates are stacked.

Other solution means will be made clear by referring to embodiments of the invention.

An effect obtained by representative one of aspects of the present invention is to implement is to implement a large-capacity information memory apparatus.

Other objects, features and advantages of the invention will become apparent from the following description of the embodiments of the invention taken in conjunction with the accompanying drawings.

DESCRIPTION OF THE EMBODIMENTS

Figure 1:
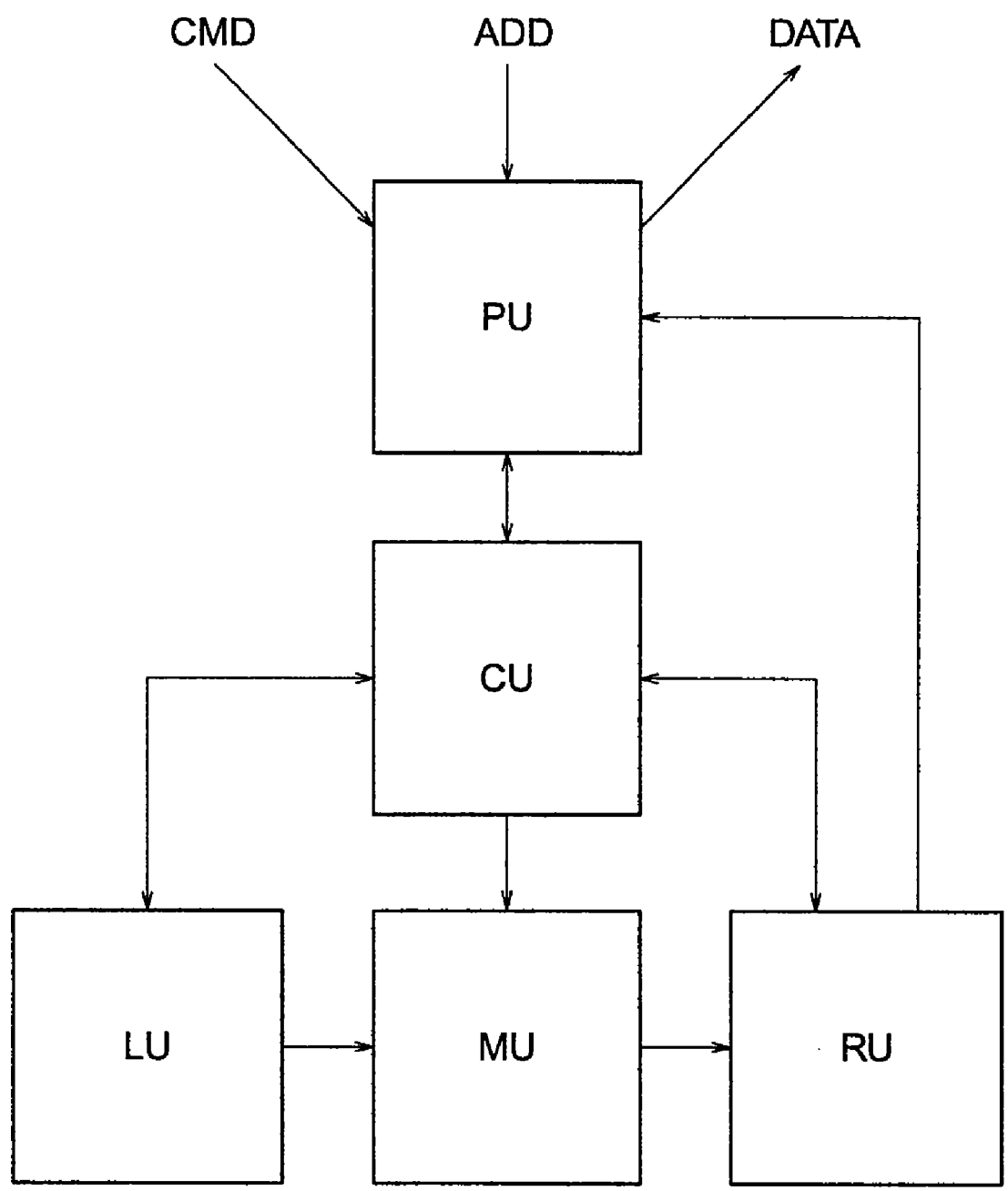
FIG. 1 is a block diagram of a first embodiment of an information memory apparatus according to the present invention.

Hereafter, embodiments of the present invention will be described in detail with reference to the drawings. Throughout all drawings for explaining the embodiments, the same members are denoted by like reference characters as a general rule and their repeated description will be omitted. The drawings and description of the present invention are simplified with the object of illustrating elements needed to understand the present invention clearly. At the same time, other elements considered to be well known are excluded for brevity. It will be appreciated by those skilled in the art that other elements which are not illustrated are desired or needed to implement the present invention. Since such elements are well known in the art and are not helpful to better understanding of the present invention, however, such elements will not be described in the present specification.

Figure 2:
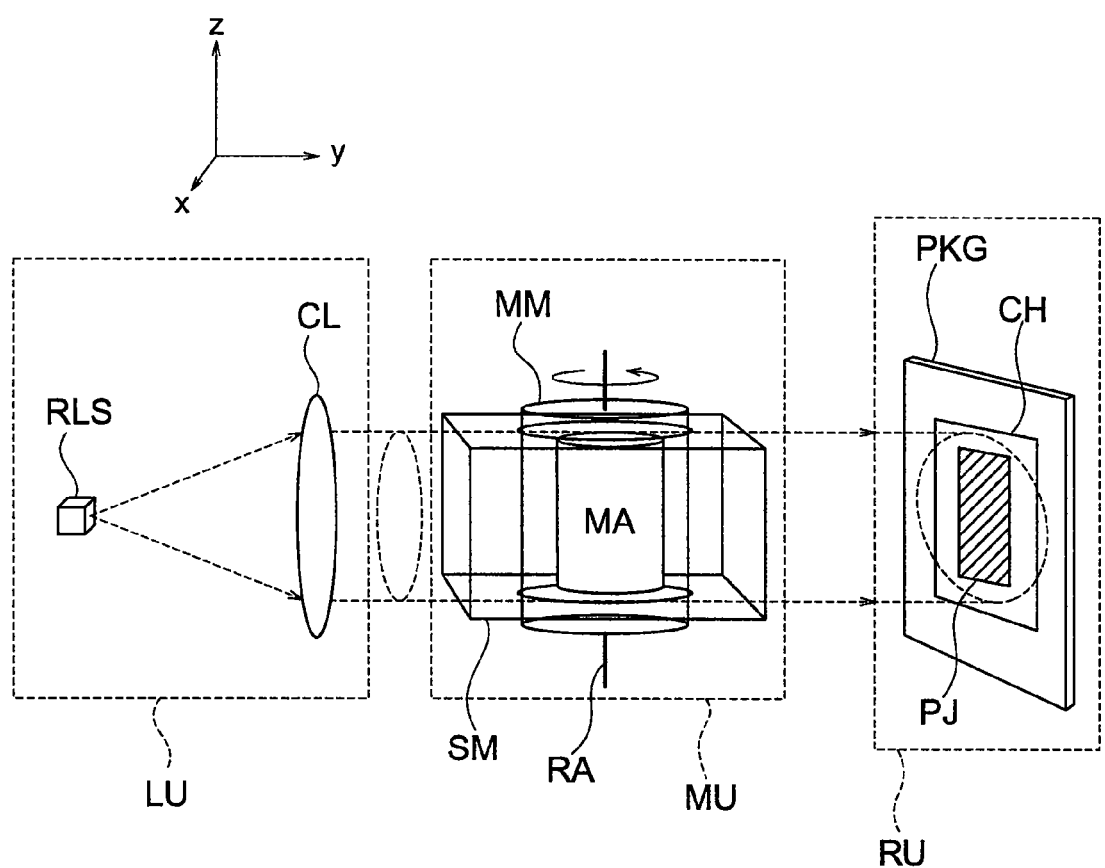
FIG. 2 is an oblique view of principal components of the first embodiment of the information memory apparatus according to the present invention.

FIG. 1 and FIG. 2 show a first embodiment of an information memory apparatus according to the present invention. FIG. 1 is a block diagram showing principal parts (hereafter referred to as units) in the present embodiment. FIG. 2 is an oblique view of a concrete configuration example. By the way, a y-axis in FIG. 2 is an axis which extends from an illumination unit LU to a reading unit RU, and an x-axis is an axis perpendicular to paper. Hereafter, the same holds true unless otherwise noted.

In FIG. 1, MU denotes a memory unit which stores data in minute areas discriminated by using the three-dimensional address, as difference in optical transmissivity. LU denotes an illumination unit and RU denotes a reading unit. The illumination unit LU irradiates light to the memory unit MU, and the reading unit RU takes a projection image required for computation of computer tomography. CU denotes a control unit, which controls the rotation and vertical movement of a memory medium in the MU. PU denotes a computation unit, which conducts signal processing on data of the projection image supplied from the reading unit RU on the basis of the principle of the computer tomography, and calculates arrangement and values of data recorded in the memory unit MU. In the present embodiment, a three-dimensional address range ADD and a command CMD are input from the outside to the computation unit PU. The control unit CU controls the illumination unit LU, the memory unit MU and the reading unit RU. As a result, the reading unit RU takes a plurality of projection images as described later. Values of data in the memory unit MU corresponding to the input address range are found by computation in accordance with the principle of the computer tomography and output. Arrows shown in the present block diagram indicate data and control signals between the above-described blocks.

Concrete operation will now be described with reference to FIG. 2. FIG. 2 shows a configuration example of parts other than CU and PU as an oblique view. A feature of the present embodiment is that X-rays used for tomography of human bodies or the like are not utilized, but ultraviolet rays or safe light having a wavelength which is longer than that of ultraviolet rays. First, a memory medium MM formed of a cylindrical transparent material is inserted into a through hole formed in a transparent support medium SM taking the shape of a rectangular solid. This part corresponds to the memory unit MU. As the material of the support medium SM and the memory medium MM, for example, an organic matter such as transparent plastics or glass can be used. They are suitable for the present embodiment using light because they have a high transmissivity with respect to light in a wide wavelength range. Plastics are light and more excellent in shock resistance than glass. In general, however, glass is excellent in long-term preservation property. Therefore, the material should be selected according to the use condition. Among glass materials, quartz glass has a small coefficient of thermal expansion, and has a high transmissivity in a wide wavelength region ranging from infrared rays to ultraviolet rays. Therefore, reading mistakes caused by expansion attendant upon a temperature change are not apt to occur. Furthermore, quartz glass can withstand an abrupt temperature change such as a fire as well. Therefore, quartz glass is suitable for the material of the support medium SM and the memory medium MM in the present invention.

Here, a cylindrical area MA within the memory medium MM is a memory area. In the memory area MA, a large number of minute areas are distributed in a three-dimensional form. An embodiment of the spatial distribution of the minute areas will be described later. Relative coordinates of the minute areas correspond to addresses as a memory apparatus. Whether the optical transmissivity of each minute area is large or small correspond to '0' or '1' in data. In the ensuing description, data is supposed to be able to assume two values '0' and '1' for brevity. As a matter of course, however, data may assume multiple values, for example, in the case where the dynamic range of the reading unit RU is sufficiently wide. In other words, if a density at each pixel of a projection image taken by imaging devices in the reading unit RU can be discriminated sufficiently taken variations into account, it becomes possible to provide data with multiple values by associating the density with data. In that case, the quantity of data which can be stored increases.

As shown in FIG. 2, the illumination unit LU includes a reading point light source RLS and a collimator lens CL. The reading point light source RLS is placed in a position of a focal point of the collimator lens CL. As a result, parallel rays are output from the collimator lens, and an image required for computer tomography can be taken. As appreciated from FIG. 2, the parallel rays are cylindrical rays having a diameter equal to the size of the collimator lens. The parallel rays are parallel to an optical axis (y-axis) which couples the focal point of the collimator lens and the center of the collimator lens, and are perpendicular to the z-x plane. The parallel rays are incident on a side face (a face parallel to the z-x plane) of the support medium SM opposed to the collimator lens at right angles.

In the reading point light source RLS, a light emission substance is housed in a shading substance having a minute hole (pinhole) opened therein. As occasion demands, a lens for stopping down the light rays from the light emission substance may be incorporated. As the light emission substance, a light emission substance which emits light rays including a wavelength suitable for discriminating the optical transmissivity of each minute area is used. If a light emission substance which emits light rays of a plurality of wavelengths is utilized, it is possible that a chromatic aberration or the like of the lens poses a problem when a projection image is taken by unnecessary wavelengths. In that case, an achromatic lens or an apochromatic lens corrected in chromatic aberration should be utilized as the collimator lens CL, or a filter for cutting off light rays having unnecessary wavelengths should be attached to the reading unit RU, as occasion demands. As the collimator lens CL, an aspherical lens or a lens system formed of a plurality of lenses may also be used to correct aberrations other than the chromatic aberration as occasion demands.

The parallel rays generated by the illumination unit LU as described above are incident on the side face of the support medium SM as shown in FIG. 2, then output from an opposite side face of the SM via the memory medium MM, and input to an imaging chip CH. As a result, one of projection images PJ of the memory area MA within the memory medium MM can be taken.

Rays input to the imaging chip at this time are parallel rays which have passed through the memory area MA. Here, the support medium SM is formed of a prism (in the present embodiment, a rectangular solid). Since one side of the prism is parallel to the z-x plane, it becomes possible to convey the parallel rays output from the collimator lens CL to the memory medium MM as they are without refracting them. It is desirable to make the gap between the support medium SM and the memory medium MM small to reduce the influence of refraction in this part as long as the rotation is not hindered. If the support medium SM and the memory medium MM are designed so as to make the curvature of curved surfaces through which light is transmitted small as far as possible, then the angle formed by light and the interface becomes close to the right angle and brings about an effect of reducing the influence of refraction and influence of aberration. In addition, it is also effective in reducing the influence of flaws of the interface, insufficient precision of the surface or the refraction at the surface to fill the gap with a fluid such as oil which is close in refractive index to the material of the support medium SM and the memory medium MM. In other words, if an absolute value of a refractive index difference between the support medium SM and the fluid is less than an absolute value of a refractive index difference between the support medium SM and the air and an absolute value of a refractive index difference between the memory medium MM and the fluid is less than an absolute value of a refractive index difference between the memory medium MM and the air, then it becomes possible to reduce the influence of refraction.

Furthermore, it is possible to make the gap between the support medium SM and the memory medium MM constant in all places by using a cylinder as the memory medium MM. In other words, the memory medium is rotated. If a memory medium taking a shape other than the cylinder is used, therefore, it is necessary to provide a hole for the support medium SM so as to match a part of the memory medium having the largest rotation radius. In other places, a large gap is formed. It becomes possible to make the gap between the support medium SM and the memory medium MM small by making the memory medium MM cylindrical.

Subsequently, projection images are further taken while rotating the memory medium MM around a rotation axis RA little by little. Data required for computation of the tomography are collected by thus causing the memory medium MM to make one revolution. In the present embodiment, projection images using parallel rays are taken, and consequently it becomes possible to find data within the memory area MA by conducting simple tomography computation.

In addition, in the present embodiment, the projection image in the memory area MA is adapted to fall in the imaging chip. Therefore, it is also unnecessary to move the memory medium MM vertically. This configuration is suitable for a small-sized memory because the configuration of the control unit can be simplified. If an MA which is long in the RA axis direction (z-direction) is used as the MA, it is a matter of course that movement of the memory medium in the RA axis direction should also be conducted. Since a chip having a two-dimensional arrangement of pixels is utilized as the imaging chip here, the movement quantity of each time should correspond to pixels falling within the z-direction of the imaging chip.

In FIGS. 1 and 2, a point light source is used as RLS, and light from the RLS is incident on the circular collimator lens CL to obtain parallel rays. Projection images of the MA using the light rays are taken by the two-dimensional imaging chip CH. However, the present invention is not restricted to this. For example, in the case where the cost takes precedence of the readout time, imaging may be conducted while moving the memory medium along the RA axis each time the memory medium makes one revolution, by using a lens which is thin in the z-axis direction and a one-dimensional imaging chip of line sensor type. It is also possible to generate parallel rays by using a slit-like light source which extends in the z-direction as the RLS and a cylindrical lens which extends in the z-direction as the CL. If parallel rays which are long in the z-direction are necessary, it reduces the expense as compared with the case where a circular large-sized lens is used in some cases.

If rotational projection images of the memory area MA can be obtained as described above, then the section shape of the memory medium, i.e., the distribution of memory cells can be calculated by using the principle of the computer tomography described in the aforementioned paper written by Rosenfeld et al.

The calculation is conducted by the computation unit PU. The principle for calculating the sectional image from the rotational projection images is well known, and consequently description thereof will be omitted. However, it is a calculation method called reverse Radon transform or back projection, or a calculation method obtained by improving the former-cited calculation method and called filtered back projection.

In the embodiment, the projection image of the whole memory area MA falls within the imaging device. If data corresponding to one revolution are acquired, therefore, a section of the MA at arbitrary Z can be calculated. In some cases, however, only distribution information of memory cells in a partial area of the MA in the z-direction is needed. In such a case, it is a matter of course that only data obtained from light transmitted through an area desired to provide data should be stored, among data of rotational projection images in all areas in the z-direction.

Heretofore, the embodiment of the information memory apparatus capable of reading data arranged in the memory medium in the three-dimensional form has been described with reference to FIGS. 1 and 2. As a result, it is possible to read three-dimensional data by only causing the memory medium MM to make one revolution. As compared with the hard disk, digital video disk and compact disk which are conventional information memory apparatuses, therefore, it becomes possible to produces a large capacity information memory apparatus without using the microprocessing technology. Therefore, data can be written into and read out from a solid body in the three-dimensional form without using complicated wiring and manufacturing processes used in existing two-dimensional semiconductor memories. Furthermore, since it is not necessary to rotate the medium at high speed, a drive device can be simplified and the power dissipation can also be reduced as compared with the hard disks and optical disks. In addition, since data writing and reading are conducted from the side face of the memory medium, the height of the cylinder can be increased without causing a drop of the signal-to-noise ratio incurred when the number of layers is increased and described in JP-A-11-337756.

Furthermore, since the width of the parallel rays in the x direction is at least the size of the memory area MA in the x direction, transmissivity values in the diameter direction of the memory area located within the cylindrical medium and in a plurality of places parallel to the diameter direction can be obtained. Therefore, it is avoided that data required for computer tomography become insufficient as described in JP-A-06-076374.

In addition, since parallel rays formed by the collimator are incident on the side face of the support medium SM parallel to the z-x plane, it becomes possible to reduce the influence of refraction of incident rays.

A second embodiment of the present invention will now be described with reference to FIGS. 3 and 4. The present embodiment has a feature that it has a writing function as well, as compared with the embodiment described with reference to FIG. 2 is read only. Taking a digital video disk as an example, the apparatus in the first embodiment is an apparatus for exclusive use of reproduction. On the other hand, in the second embodiment, an image reproducing and recording apparatus in which data can be written and a user individual can record a movie or the like can be constituted.

Figure 3:
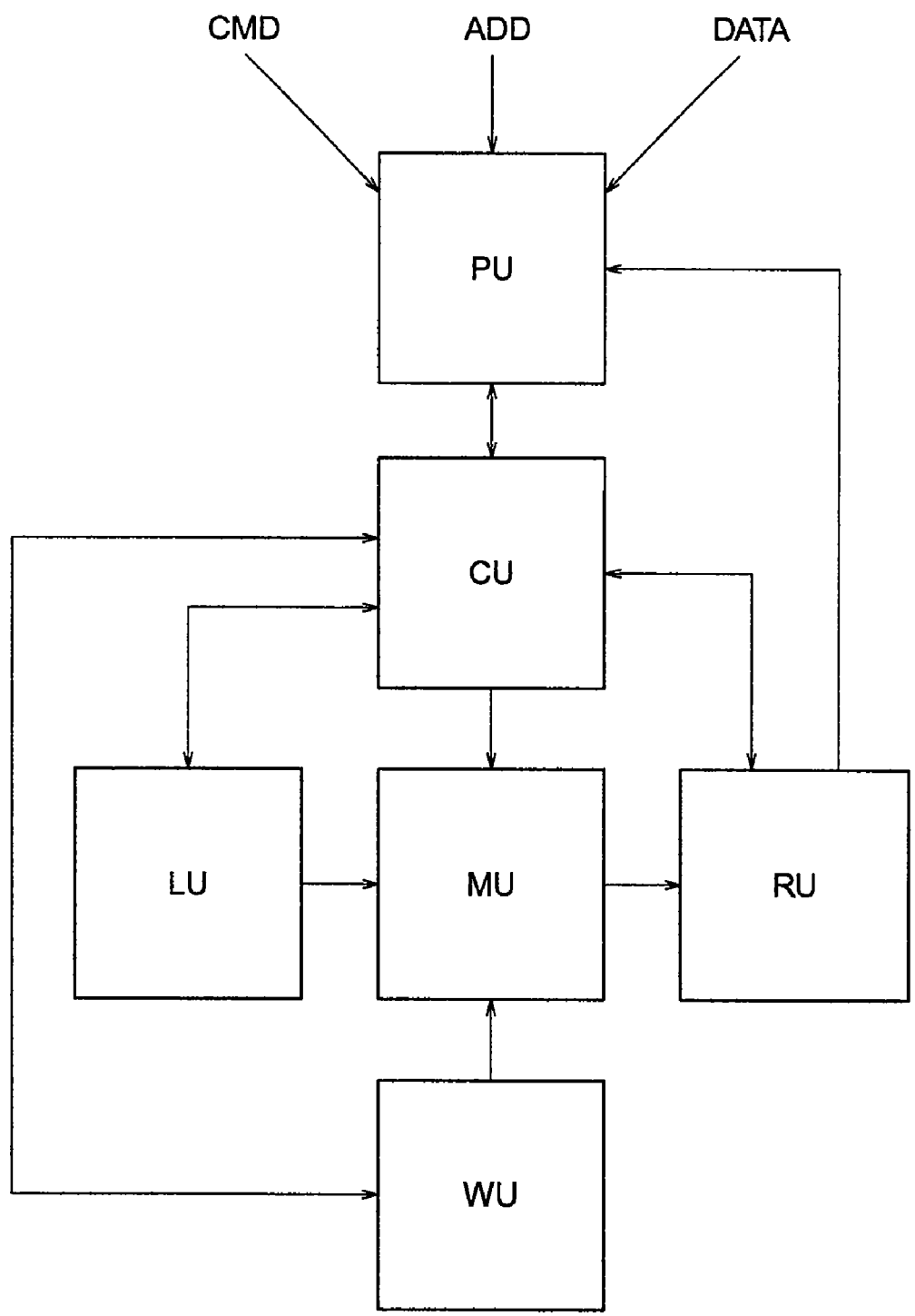
FIG. 3 is a block diagram of a second embodiment of the information memory apparatus according to the present invention.

FIG. 3 is a block diagram showing principal units in the present embodiment. FIG. 4 is an oblique view of a concrete configuration example. As appreciated by comparing FIG. 3 with FIG. 1, the present embodiment is obtained by adding a writing unit WU to the embodiment shown in FIG. 1. The writing unit WU is provided to write data into the memory unit MU.

A concrete operation will now be described with reference to FIG. 4. Since reading operation is similar to that in the embodiment described with reference to FIGS. 1 and 2, description thereof will be omitted and only the writing operation will be described. In FIG. 4, WLS denotes a writing light source and OL denotes an object lens. They constitute a writing unit WU in the block diagram. Light rays emitted from the WLS are focused by the object lens OL, and a focal point is formed within the memory area MA. Heat denaturation is caused in a corresponding minute area. As a result, data is written. By the way, for selecting a minute area disposed three-dimensionally, the focal point can be first moved in a direction coupling centers of the light source WLS and the object lens by moving the object lens OL forward or backward with respect to the writing light source WLS. By combining this movement with a movement of rotating the memory medium MM around the RA axis (z-axis), the focal point can be moved on the x-y plane in FIG. 4. In addition, the focal point can be moved in the z-axis direction by moving the memory medium MM in the direction of the rotation axis RA. By combining them, it is possible to form a focal point of rays in a desired location within the memory area MA and cause heat denaturation near the focal point. The control unit CU conducts control of them in accordance with the command CMD, the address ADD and data DATA which are input from the external.

If writing is conducted with exposure for a short time by using a strong light source such as a laser as the writing light source WLS, it is possible to cause heat denaturation locally in a minute area and it becomes possible to record data at a higher density. If there is an area already subjected to heat denaturation on a route of light rays for writing when writing data, writing cannot be conducted sufficiently in some cases, for a cause such as light intensity becoming weak. In that case, the above-described problem can be lightened or solved by selecting a lens which is large in angle formed by seeing the object lens from the focal point position, i.e., a lens having a larger NA, or writing data from a place near the rotation axis.

The present embodiment has not only the writing function but also a reading function. Various checks on writing can be conducted by utilizing the reading function. For example, after data are written, the written data are checked by using the reading function. If heat denaturation for writing is not sufficient, the data can be written again. Furthermore, the deviation between coordinates at the time of writing and coordinates at the time of reading can be verified beforehand by conducting positioning marking in a place other than the memory area MA and reading the marking. The computation unit PU conducts computation on the basis of a result of the verification. As a result, it becomes possible to avoid causing false operation under the influence of aberration, for example, distortion aberration in the reading collimator lens CL or the writing object lens OL.

Figure 4:
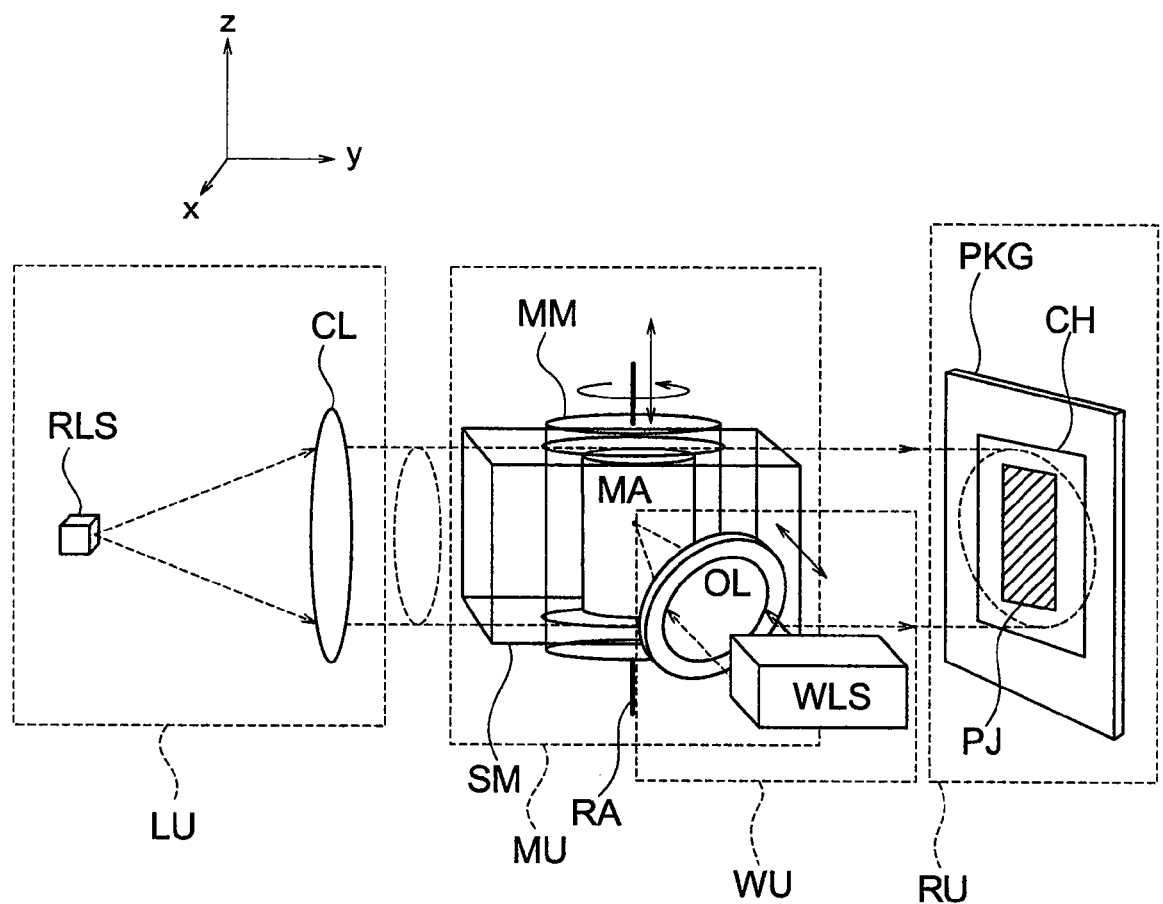
FIG. 4 is an oblique view of principal components of the second embodiment of the information memory apparatus according to the present invention.

In the embodiment shown in FIG. 4, writing is conducted from a direction perpendicular to the rotation axis RA by using the writing light source WLS and the object lens OL. However, the present invention is not restricted to this. For example, it is also possible to conduct writing from a direction parallel to the rotation axis RA. In that case, light rays for writing are incident on the top face or bottom face of the memory medium MM which is planar. In this case, a three-dimensional pattern can be written into the memory medium MM by moving the object lens OL to move the focal point in the RA direction and moving the WLS and OL on a plane perpendicular to RA two-dimensionally. When mounting a device required for reading and a device required for writing, such a movement brings about a merit that they can be mounted easily without interfering with each other.

In the ensuing embodiments, the configuration of the writing unit is not especially described. As a matter of course, however, a writing unit using a laser or the like which is similar to that in the embodiment shown in FIG. 4 can be provided in addition to a reading unit.

Embodiments concerning the arrangement of minute areas CELL which store data will now be described with reference to FIGS. 5A, 5B and 5C and FIGS. 6A, 6B and 6C. Hereafter, CELLs are referred to as memory cells for brevity. As described heretofore, the minute areas, i.e., the memory cells CELL are arranged within the memory area MA three-dimensionally.

Figure 5A:
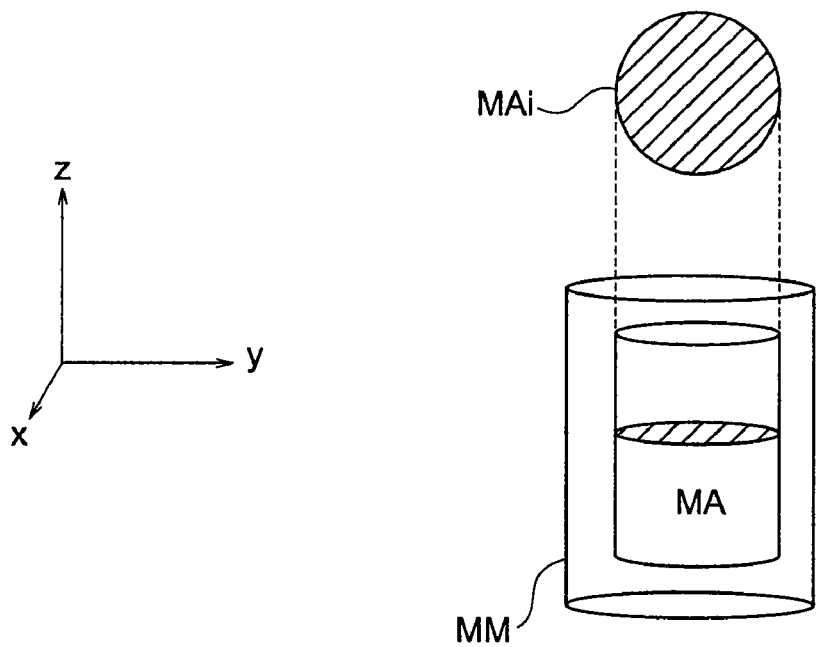
FIGS. 5A, 5B and 5C show a first embodiment of a structure of a memory medium used in the present invention.
Figure 6A:
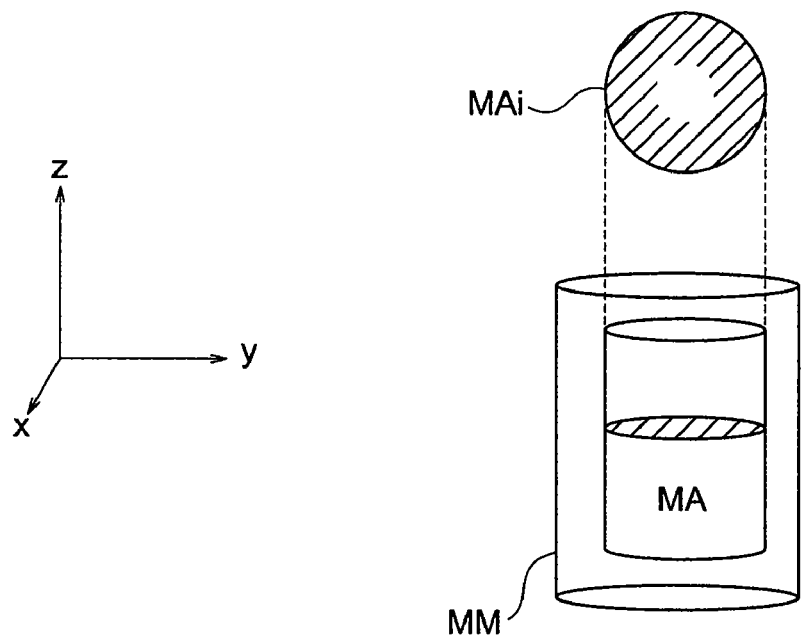
FIGS. 6A, 6B and 6C show a second embodiment of the structure of the memory medium used in the present invention.

FIG. 5A shows an embodiment in the case where the memory area MA takes the shape of a cylinder in the same way as figures of the embodiments heretofore described. FIG. 6A shows an embodiment in which a part having no memory cells is provided in a center part of the cylinder in the memory area MA. Besides this, various modifications such as a rectangular prism are also possible as long as they are convenient on the data writing or reading operation. If the memory area MA takes the shape of a rectangular prism, there is a merit that fractions are not apt to appear when representing coordinates of writing data in the MA by orthogonal coordinates x, y and z, resulting in convenience in handling.

FIGS. 5B, 5C, 6B and 6C show embodiments of memory cell arrangement on a Mai plane which is a section of MA. This section Mai is a plane perpendicular to an axis which couples centers of circles located at both ends of the cylindrical memory medium MM. White circles and black circles are shown in FIGS. 5B, 5C, 6B and 6C. Both of the white circles and black circles indicate memory cells. White circles represent memory cells having a high optical transmissivity and represent data '1'. Black circles represent memory cells having a low optical transmissivity and represent data '0'. Here, the above-described correspondence is supposed for convenience. However, the correspondence between the high and low transmissivity values and the data '1' and '0' may be reversed. As appreciated from this sectional view, memory cells are formed at some distance between. The distance between the memory cells should be made at least twice the wavelength of light used in reading so as to prevent reading from becoming difficult under the influence of light interference. The spacing between memory cells may be changed according to the direction. For example, if the spacing between memory cells in the z-direction is made larger than the spacing between memory cells in the x-y plane, it becomes easy to judge whether the memory medium MM is attached with inclination from the rotation axis by comparing projection images of memory cells at a plurality of rotation angles. As a result, it becomes possible to modify the attaching angle of the memory medium MM before reading operation or conduct correction of reading coordinates against inclination by computation even after reading.

Whether the transmissivity is high or low is relative. It is not meant that a white cell is 100% in transmissivity and a black cell is 0% in transmissivity. The transmissivity of each memory cell may be set equal to a value between 0 and 100% considering the range of transmissivity of a section when projected, the dynamic range of the imaging device, and transmissivity of the medium other than memory cells. If there is a memory cell which is 0% in transmissivity when taking a projection image on the basis of the computer tomography, however, information of a memory cell hidden by the memory cell which is 0% in transmissivity cannot be obtained in some cases according to the rotation angle of the memory medium MM. Therefore, it is desirable that a lower transmissivity value in one memory cell is not an extremely low value.

Figure 5B:
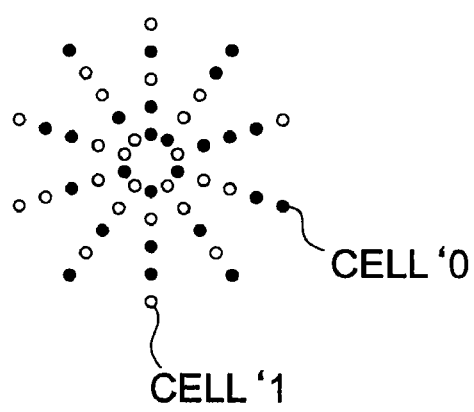
Figure 5C:
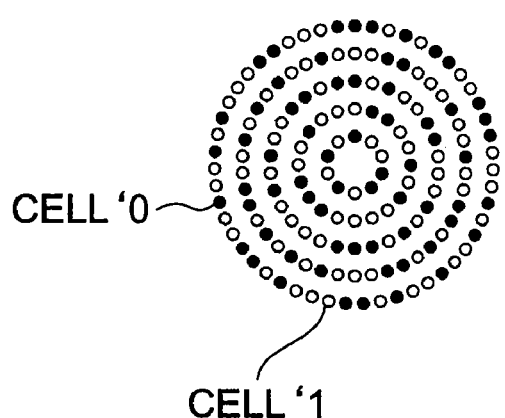
Figure 6B:
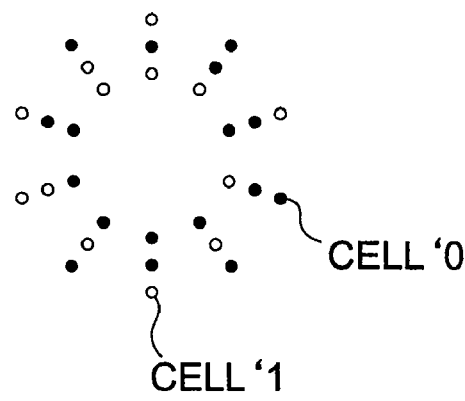
Figure 6C:
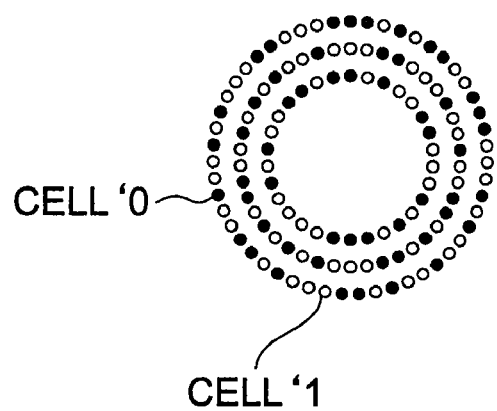

In FIGS. 5A, 5B and 5C, memory cells are distributed as far as the center of the memory area. On the other hand, there are no memory cells in the center of the memory area in FIGS. 6A, 6B and 6C. If the memory cells are distributed as far as the center as shown in FIGS. 5A, 5B and 5C, it is advantageous in respect of the memory capacity per unit volume. If memory cells are distributed as far as the center part, then intensity of light transmitted through the center part is not obtained sufficiently and the reading error becomes large according to the transmissivity or density of memory cells. If in that case memory cells are distributed only in the peripheral part as shown in FIGS. 6A, 6B and 6C, then the difference in transmitted light intensity between the peripheral part and the central part of the memory area MA can be made small and it can be avoided that the dynamic range in reading becomes insufficient and the error becomes large.

Embodiments concerning the arrangement of memory cells will now be described with reference to FIGS. 5B, 5C, 6B and 6C. FIG. 5B and FIG. 6B show embodiments in which memory cells are arranged radially from the center of a section Mai. In this arrangement, it is sufficient to rotate the memory medium MM at a constant angular velocity at the time of writing. Therefore, there is a merit that a drive mechanism in the control unit CU can be simplified. As a distance from the center becomes larger within the memory area MA, however, the density of memory cells becomes low. As the location advances to an outer circumference part, therefore, the number of memory cells per unit volume also decreases. If this poses a problem, embodiments shown in FIG. 5C and FIG. 6C can be used. They are embodiments in which the line density of memory cells along a concentric circle is made constant regardless of the distance from the center. Therefore, it becomes possible to avoid the problem that the density of memory cells becomes low as the distance from the center becomes large. In addition, memory cells are arranged on the section Mai in a concentric circle form. If laser rays are focused by the object lens OL to conduct writing as shown in FIG. 4, therefore, writing into a plurality of memory cells on the concentric circles can be conducted by rotating the recording unit while keeping the location of the lens constant. In the embodiments shown in FIG. 5C and FIG. 6C, the laser pulse irradiation time interval in the writing unit can be made constant by making the rotation velocity of the memory medium MM lower when writing into memory cells on a concentric circle far from the rotation center of the MA in data writing, as compared with memory cells located near the rotation center.

In FIGS. 5B, 5C, 6B and 6C, memory cells are depicted to be larger for comprehensibility. Therefore, the number of memory cells in the section is as few as approximately 50 in FIGS. 5B, 5C, 6B and 6C. As a matter of fact, however, the size of each memory cell can be made micron order or less by narrowing down the laser spot with the writing unit WU shown in FIG. 4 or the like. For example, if the distance between memory cells is set equal to 10 µm and the section diameter of the memory area MA is set equal to 20 µm, the number of memory cells in the section Mai exceeds three millions. If at this time the dimension and the distance between memory cells in a direction perpendicular to the section Mai in the MA are made the same as those described above, the number of memory cell layers on a straight line perpendicular to the section Mai becomes approximately 2,000. In the memory area as a whole, the number of memory cells becomes approximately 2,000 times as many as the above-described number. Thus, it becomes possible to record the memory capacity of 6 gigabits.

Since information is represented by two values in an area having a high transmissivity value and an area having a low transmissivity value, information per memory cell is one bit. As described above, however, data of a plurality of bits can be represented by using a large number of values. In that case, the memory capacity is further increased. For example, if sixteen values are supposed, four bits per memory cell are obtained, resulting in a memory capacity of 24 gigabits. It is a great merit of three-dimensional recording that recording of such a large capacity becomes possible though the distance between memory cells, i.e., the pitch is made as large as 10 µm.

In the semiconductor memory, a memory capacity of approximately one gigabit is barely implemented by using a processing technology of 0.1 micron or less. In the DVD, information is recorded on a disk having a diameter of approximately 12 cm (120 mm) at intervals of approximately 400 nm at a minimum. The capacity in this case is approximately 4 Gbytes in the newest DVD. It is appreciated from this calculation that a large capacity information memory apparatus can be implemented without relying upon microprocessing if memory cells are arranged three-dimensionally as in the above-described embodiment. In addition, since memory cells are hermetically sealed within the medium included in the memory unit MU, memory of information over a long period of time can be anticipated.

The embodiments described with reference to FIGS. 1 to 4 are based on the assumption that ultraviolet rays, visible rays, or infrared rays are used to read out data. Light in this wavelength region has an advantage that the safety to a human body is high as compared with X-rays having a shorter wavelength. However, X-ray tomography is used widely in the field of medical treatment. If only safety in the place of use can be ensured, therefore, the X-ray tomography can be utilized in the information memory apparatus according to the present invention as well.

Figure 7:
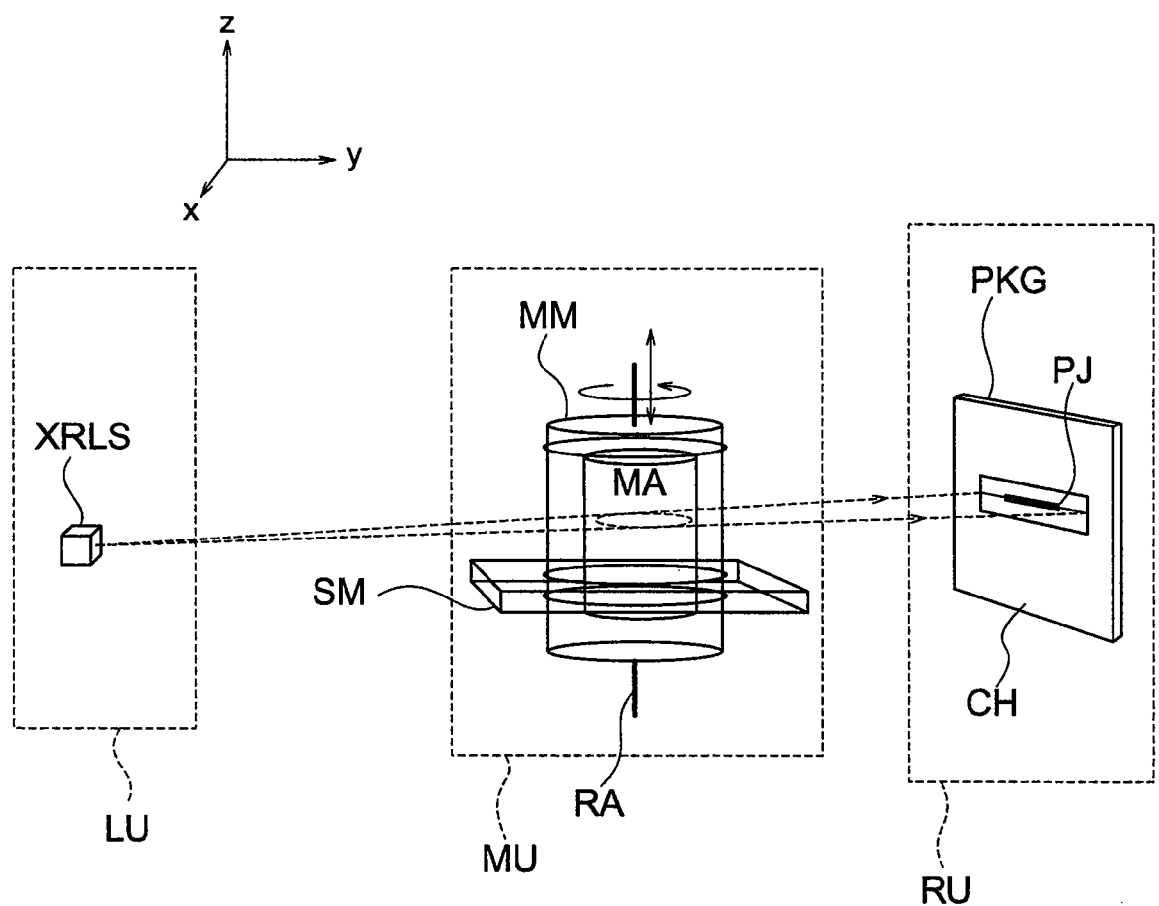
FIG. 7 is an oblique view of a third embodiment of the information memory apparatus according to the present invention.
Figure 8:
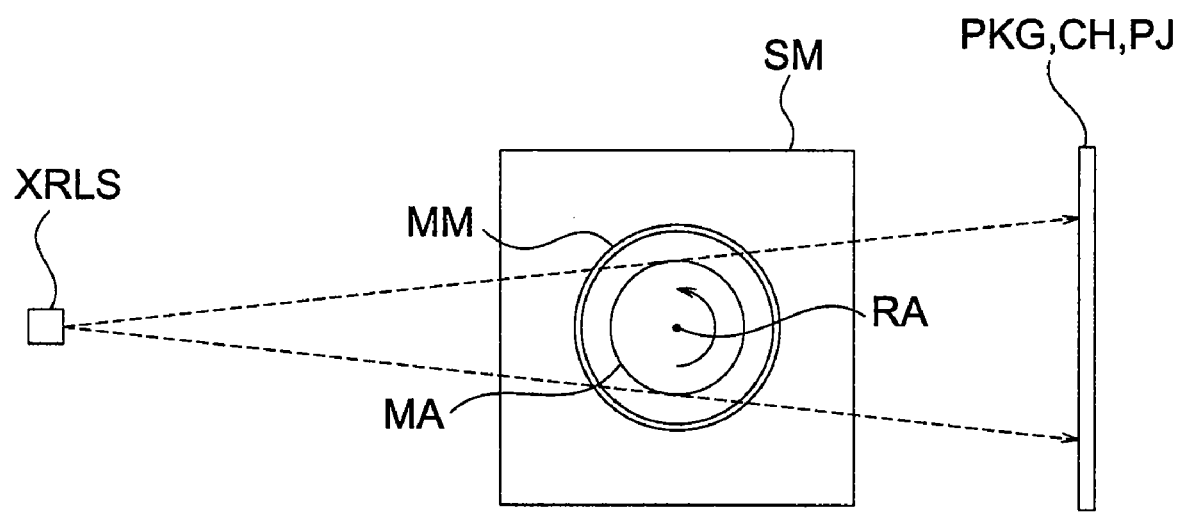
FIG. 8 is a plan view of the third embodiment of the information memory apparatus according to the present invention.

FIGS. 7 and 8 show a principle of an embodiment in which data stored within the cylindrical memory medium MM are read by utilizing X-rays. FIG. 7 is an oblique view, and FIG. 8 is a plan view seen from the z-direction. The embodiment is basically the same as the foregoing embodiments. Since X-rays are extremely short in wavelength, however, it is difficult to manufacture the collimator lens. As shown in FIG. 7, therefore, X-rays spread from an X-ray source in a fan form are generated and incident directly on the memory medium MM without being passed through the support medium SM. Since X-rays are intense in the property of going straight on, the incident X-rays are transmitted through the memory medium MM in the straight line form as they are. The image of the transmitted X-rays is taken by the imaging chip CH.

The X-rays shown in FIG. 7 are spread on the x-y plane in a fan form, but are thin in the z-direction. Therefore, the memory medium MM is moved in the z-direction, i.e., along the RA axis to a place where desired data is stored, and projection images corresponding to one revolution are obtained. As a result, data of the corresponding section are read.

As the imaging chip, a line-shaped chip, i.e., the so-called line sensor for X-rays can be used. By the way, since X-rays transmitted through the memory medium MM are not parallel rays, computation processing becomes somewhat complicated. Since its method is well known as tomography using an X-ray fan beam, however, details thereof will be omitted. However, its method is described in the aforementioned paper written by Rosenfeld et al. It is important that the spread of fan-shaped X-rays has a size capable of containing a section of the memory area MA. As a merit of the present embodiment, an increase of choices of the memory medium MM obtained from a high transmissivity of X-rays can be mentioned.

Furthermore, since X-rays are intense in property of going straight on, means for preventing refraction given by the cylindrical memory medium MM can be omitted. Therefore, it is not necessary to compensate the influence of refraction caused in the memory medium MM by using the support medium SM as in FIG. 2 and FIG. 4. As a result, in the present embodiment, choices of the material of the support medium SM are also widened and it becomes possible to enhance the robustness of the apparatus.

If the memory area MA is made large, then it is necessary to make the width of the imaging chip CH large accordingly in the embodiment described with reference to FIGS. 7 and 8 as well. The case where it poses a problem from the viewpoint of cost is also conceivable. In that case, a function of moving the imaging chip CH together with a package PKG in the x-direction shown in FIG. 7 should be provided and images should be taken in installments. Or an embodiment shown in FIGS. 9 and 10 can also be used.

Figure 9:
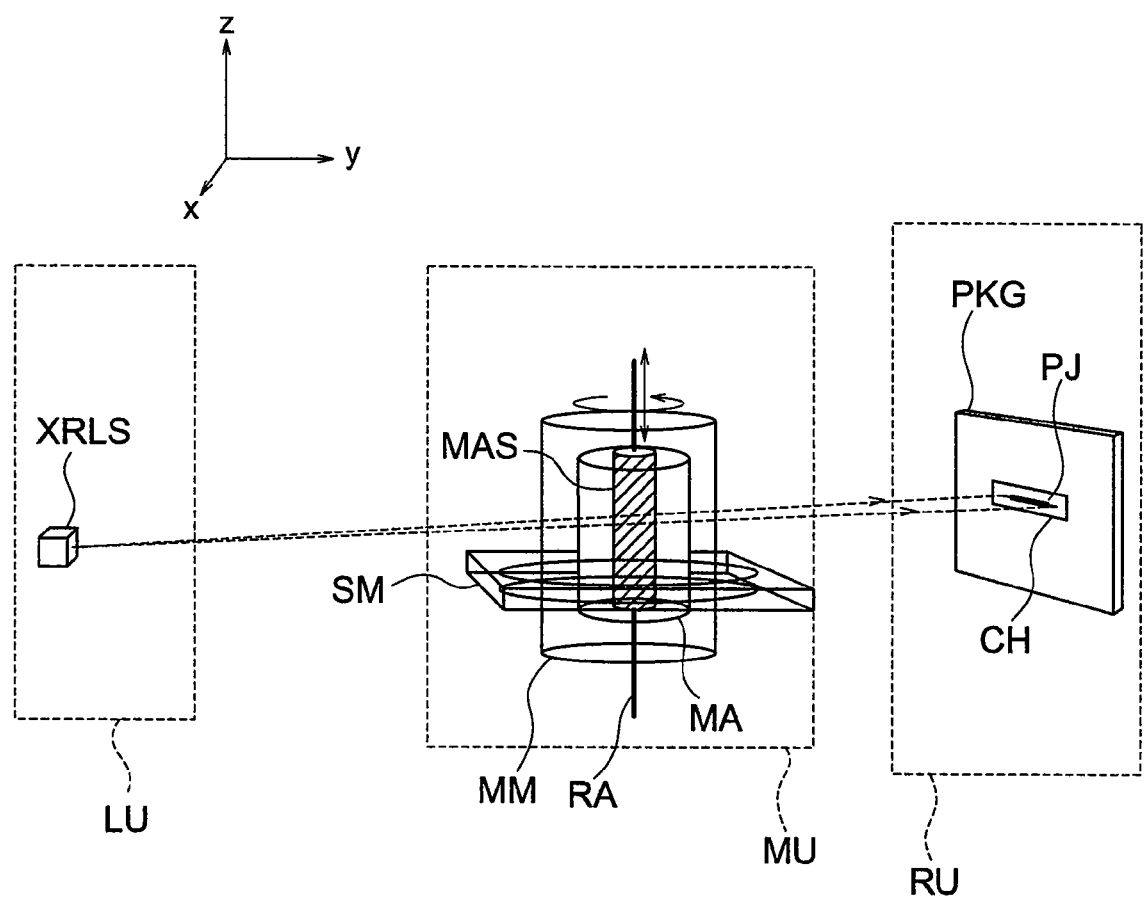
FIG. 9 is an oblique view of a fourth embodiment of the information memory apparatus according to the present invention.
Figure 10:
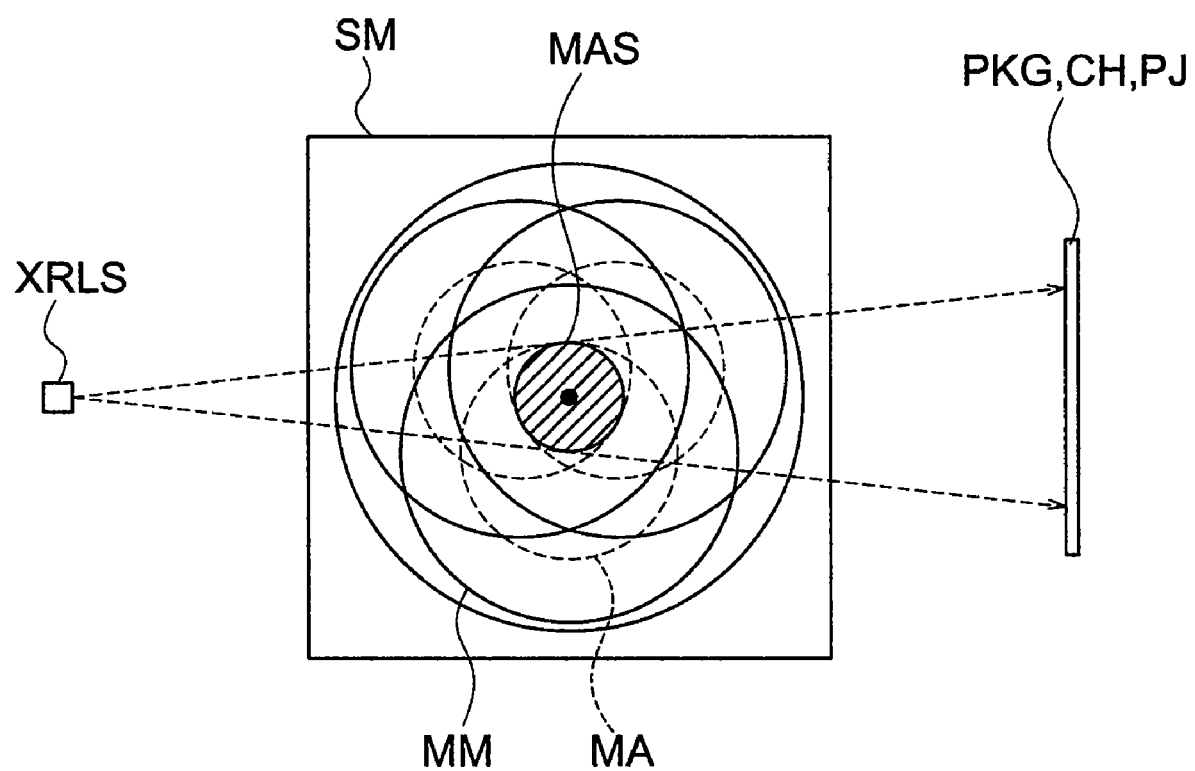
FIG. 10 is a plan view of the fourth embodiment of the information memory apparatus according to the present invention.

FIG. 9 shows an oblique view of the embodiment. FIG. 10 shows a plan view seen from the z-direction. The present embodiment is an embodiment which utilizes X-rays in the same way as the embodiment described with reference to FIGS. 7 and 8. However, the present embodiment is an embodiment suitable for the case where the diameter of the memory area is greater than the width of the imaging chip in the x-direction. The present embodiment has a feature that only a partial area of the memory area MA in the memory medium MM by causing the memory medium MM to make one revolution.

In the present embodiment, not the center axis of the memory area MA but a center axis of a sub memory area MAS which is a part of the memory area MA is used as the rotation axis RA as appreciated from FIG. 9. The fan-shaped X-ray beam covers the sub memory area MAS and arrives at the imaging chip CH. Since the center axis of the sub memory area MAS is used as the rotation axis in the present embodiment, it is possible to obtain only information concerning the sub memory area MAS from among information obtained when the center axis of the memory area MA is used as the rotation axis. Therefore, section information of the sub memory area MAS can be calculated by causing the memory medium MM to make one revolution. Furthermore, it becomes possible to utilize data stored in arbitrary place of the memory medium MM by moving the memory medium MM in the z-direction and changing the rotation axis to an arbitrary place.

Heretofore, the embodiments utilizing X-rays have been described with reference to FIGS. 7 to 10. In these embodiments, it is not necessary for the support medium to transmit light. Therefore, it is not necessary to prepare an optically homogeneous material and open a precise hole for inserting the memory medium MM into the support medium SM. Since X-rays are harmful to a human body, however, the embodiments are suitable to the case where an installation place where safety measures to the human body can be taken is obtained. By the way, if the X-rays are used, it is necessary to use a matter which is different in X-ray transmissivity from a matter forming the memory medium MM, as memory cells. For that purpose, it is effective to use a matter containing calcium, barium or iodine as memory cells. The above-described matter has a property that it is hard to transmit X-rays. Therefore, it becomes possible to discriminate '1' and '0' on the basis of a difference in absorption factor of X-rays by selectively placing the above-described matter in locations of data '0'.

Figure 11:
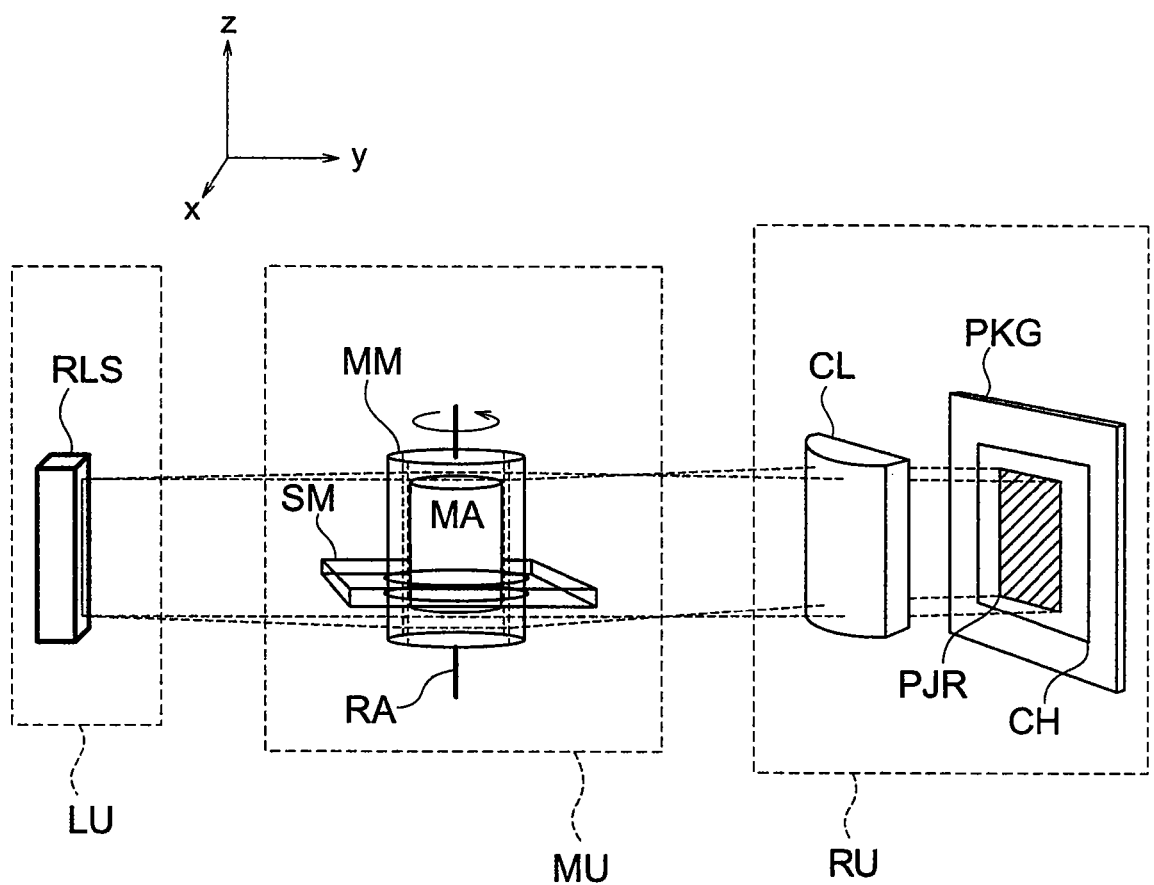
FIG. 11 is an oblique view of a fifth embodiment of the information memory apparatus according to the present invention.
Figure 12:
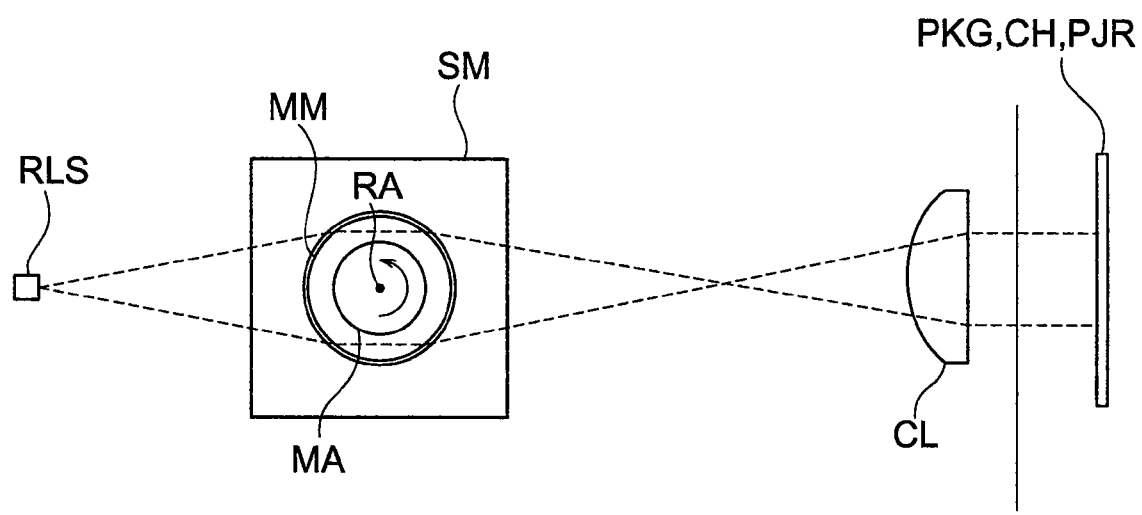
FIG. 12 is a plan view of the fifth embodiment of the information memory apparatus according to the present invention.

An embodiment which will now be described is an embodiment which uses safe light other than X-rays and which does not require the support medium SM to transmit light. FIG. 11 shows an oblique view, and FIG. 12 shows a plan view seen from the z-direction. In this embodiment, the function of converting light transmitted by the memory area MA to parallel rays is not fulfilled by the collimator lens CL and the support medium SM unlike the embodiment shown in FIG. 2, but the cylindrical memory medium MM itself is used as a substitute.

As appreciated from FIGS. 11 and 12, light emitted from a slit light source arrives directly at the cylindrical memory medium MM. Since the memory medium MM is a kind of cylindrical lens, rays passed through the inside of the memory medium can be converted to parallel rays by suitably setting the distance between the slit light source RLS and the memory medium. Once the light rays exit the memory medium MM, the light rays gradually converge again and then gradually diverge again. Since the slit light source is used, a straight line extended in the z-direction is obtained though converged. If a cylindrical collimator lens is inserted in a suitable location after the convergence, then it is possible to convert rays transmitted by the memory area MA to parallel rays again and project the parallel rays onto the imaging chip CH. It is necessary to pay attention to the fact that the projection image is inverted laterally (in the x-direction) if the collimator lens is inserted in a location after the convergence of the light rays. The collimator lens may be inserted before convergence of light rays in order to avoid the lateral inversion. In that case, however, the projection image becomes smaller than the actual memory area MA. Which should be selected depends upon the size of the imaging device and the size of the whole information memory apparatus. In the latter cited case as well, it is a matter of course that it is also possible to expand the size of the projection image if a correction lens system is further added.

In the present embodiment, it is not necessary to cause the support medium SM to transmit light in order to compensate refraction caused within the memory medium MM as heretofore described. Therefore, it is not necessary to prepare a material which is optically homogeneous as the support medium SM and open a hole at a high precision which does not pose an optical problem. This advantage is a merit which is also obtained in the above-described embodiment using X-rays. Since X-rays are not utilized in the present embodiment, however, the information memory apparatus can be constituted more safely. In the embodiment described with reference to FIGS. 11 and 12, the lens action of the cylindrical memory medium MM is utilized. If a part near the periphery of the cylinder is used as the memory area MA in this case, then the influence of the spherical aberration and chromatic aberration becomes great and a case where a bad influence is exerted upon imaging of the projection image is conceivable. In that case, this influence can be made slight by setting the diameter of the memory area to be smaller than the diameter of the memory medium MM, inserting a lens in a light path before and after the cylinder to correct the aberration, contriving specifications of the monochromatic light source, or placing a narrow-band filter in the light path.

As heretofore described, data readout in the present invention is based upon the principle of computer tomography and based upon irradiating light to the memory medium MM and obtaining the projection image of the MA from light transmitted by the memory area MA within the memory medium MM. As described above, memory cells are distributed three-dimensionally within the memory area MA, and the quantity of light transmitted by the MA is changed by them. If the size and spacing of the memory cells are close to the wavelength of light in use, then the quantity of light dispersed by memory cells within the memory area MA becomes large. As a result, there is a fear that noise may become large as compared with data to be observed as the projection image. In such a case, it is effective to utilize an optical mask or a knife-edge.

An embodiment obtained by applying an optical mask to the embodiment described with reference to FIGS. 11 and 12 will now be described with reference to FIGS. 13, 14A and 14B. Since a configuration of the present embodiment is nearly the same as that in the embodiment described with reference to FIGS. 11 and 12, its oblique view is omitted and only a plan view obtained by seeing it from the z-direction is shown in FIG. 13.

Figure 13:
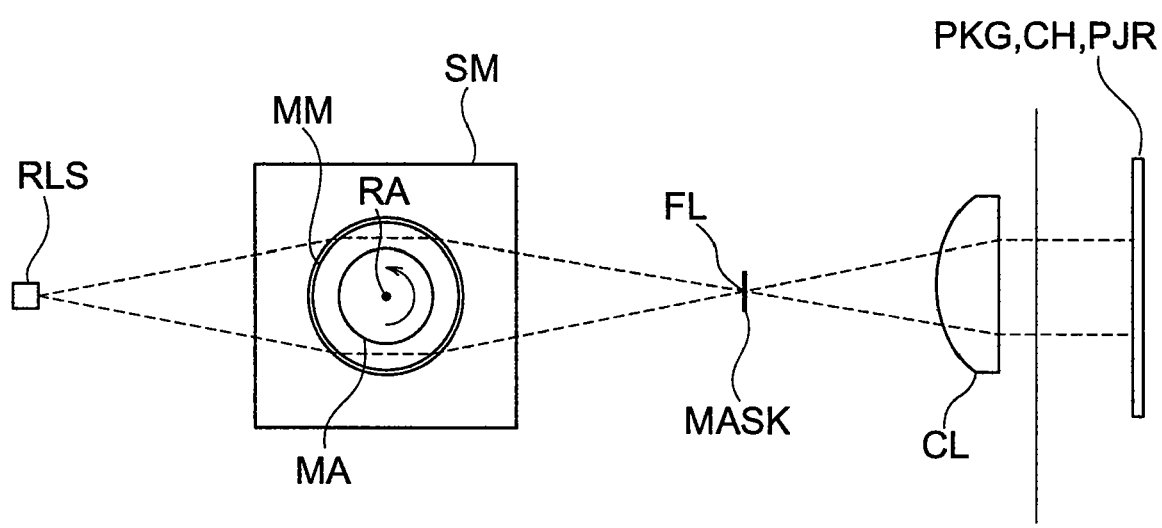
FIG. 13 is a plan view of a sixth embodiment of the information memory apparatus according to the present invention.

A feature of FIG. 13 is that light rays transmitted by the memory medium MM in parallel and light dispersed or refracted within the memory medium MM and emitted from it are separated from each other by inserting a mask MASK in a location where the light rays are converged after being transmitted by the memory medium MM. Herein, the mask means a planar component having parts which transmit light having a wavelength to be observed and parts which do not transmit the light, formed on the planar component as a desired pattern. In the case of a simple pattern, it is also possible to use the so-called knife edge which becomes sharp at its edge like a knife singly or combine two knife edges as a substitute. However, the embodiment will now be described by using the mask to simplify the description.

The principle of FIG. 13 will now be described with reference to mask patterns shown in FIGS. 14A and 14B. The present embodiment does not differ from the foregoing embodiments either in that three-dimensional data are read out from projection images of the memory area at various angles by causing the memory medium MM to make one revolution on the basis of the principle of computer tomography. Only how a projection image is taken with a high signal-to-noise ratio will now be described with reference to FIG. 13.

Supposing that dispersion or abnormal refraction is not present in the light path and aberrations of the lens can be neglected, light emitted from a slit source of light RLS in FIG. 13 is incident on the memory medium MM. Resultant parallel rays are transmitted by the memory area MA and emitted from the memory medium MM. Thereafter, the parallel rays are focused on a slit by a convex lens action of the memory medium MM. Here, the location is denoted by a focusing line FL. In the foregoing, the distance between the slit light source RLS and the rotation axis RA of the memory medium MM is equal to the distance between the rotation axis RA and the focusing line FL. If dispersion or abnormal refraction is caused on the way along the light path by dispersion or abnormal aberration, the light focused on the ideal focusing line decreases. Herein, line which is not focused on the focusing line FL is referred to as stray light.

Figure 14A:
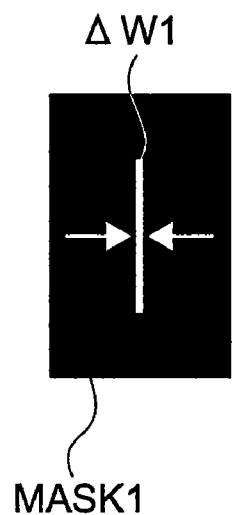
FIGS. 14A and 14B show masks in the sixth embodiment of the information memory apparatus according to the present invention.
Figure 14B:
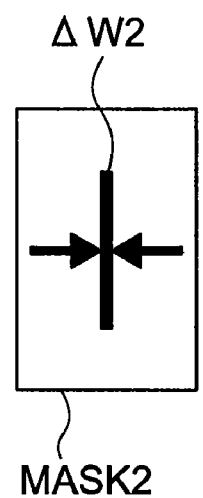

Both a mask MASK1 shown in FIG. 14A and a mask MASK2 shown in FIG. 14B are masks which take the shape of a slit in a central part. In the MASK1, a white slit part having a width $\Delta W1$ in the central part has a high transmissivity for light of a wavelength at which an image should be taken, whereas the light is transmitted little in black parts other than the white part. On the other hand, in the MASK2, a black slit part having a width $\Delta W2$ in the central part transmits little light of a wavelength at which an image should be taken, whereas white parts other than the black part have a high transmissivity. If the MASK1 in the masks is installed in the location of the light focusing line FL, then stray light which does not pass through the width of $\Delta W1$ does not arrive at the imaging device as appreciated easily. Therefore, it becomes possible to reduce the quantity of stray light as compared with the quantity of light which should be originally taken in image and raise the signal-to-noise ratio by suitably adjusting the width of $\Delta W1$. As a matter of course, the present mask can also be constituted by installing two knife edges with a spacing of $\Delta W1$ between.

In the MASK1, contrivance is made so as to obtain a high signal-to-noise ratio by cutting off the stray light. In the mask MASK2 shown in FIG. 14B, conversely the signal-to-noise ratio can be raised by taking out stray light. In the mask MASK2, the transmissivity is high in its central part and low in its peripheral part. If the mask MASK2 is installed near the focusing line FL, therefore, stray light can be taken as an image. If an image is taken without a mask beforehand and a result of imaging of the MASK2 is subtracted from the image, the influence of the stray light can be reduced. This method is effective when the MASK2 can be generated as a mask more easily than the MASK1. By the way, if data obtained by taking an image with the MASK2 is subtracted from data obtained by taking an image without a mask in the foregoing, then it is conceivable that the influence of presence/absence of the mask, such as light absorption caused by the mask, poses a problem. If it is desired to cancel such an influence, then it is desirable to take an image with a mask having the same light transmission characteristics as the peripheral part of the MASK2 over the whole face beforehand, instead of taking an image without a mask.

Even if stray light is not present, the focusing line FL does not become an ideal straight line because of the aberration of the memory medium MM as a lens, the width of the slit light source RLS, or the installation error. Therefore, the width of $\Delta W1$ or $\Delta W2$ and the installation place of the mask should be adjusted so as to become optimum according to the focusing situation and the stray light situation. Furthermore, if the change of transmissivity on the mask is made too sharp, intense dispersion of light occurs in this part and there is a possibility of becoming noise in image taking. If in such a case the change rate at the boundary is made gentle without causing a stepwise change, then there is an effect.

As heretofore described, memory cells are arranged three-dimensionally in the memory area MA within the memory medium MM. As a manufacturing method of this, for example, minute cracks may be formed in the memory area MA part within the memory medium MM by using a laser. There is also a method of uniformly mixing minute powder of a compound which is changed in light absorption and light emission characteristics by heat into the memory medium MM beforehand and causing the denaturation every minute area within the memory area MA by laser beam irradiation. They are methods suitable for the case where the memory medium MM is previously produced and thereafter writing is conducted by using a laser or the like.

Figure 15A:
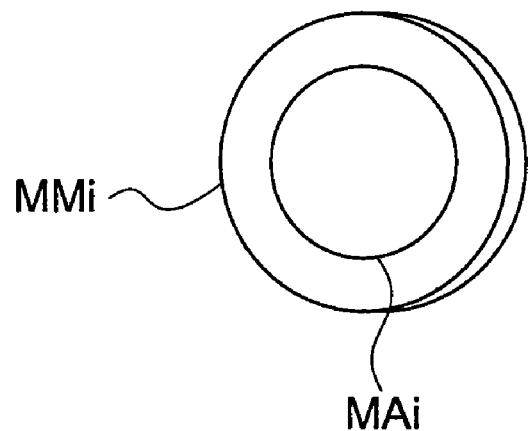
FIGS. 15A and 15B show a third embodiment of the structure of the memory medium used in the present invention.
Figure 15B:
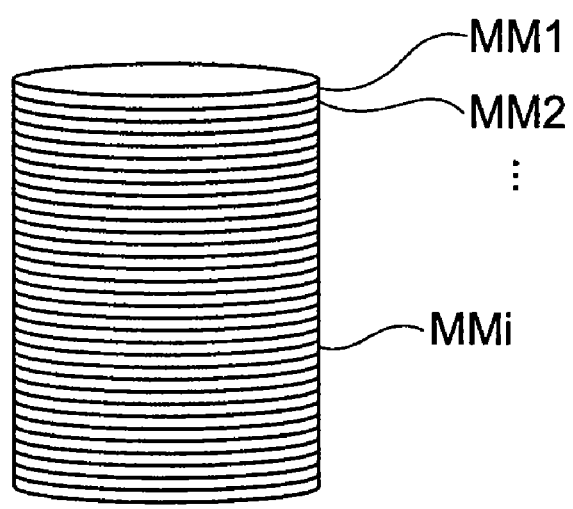

The method for producing the memory medium in the present invention is not restricted to this. For example, an embodiment shown in FIGS. 15A and 15B can be mentioned. As shown in FIG. 15A, disk-shaped slices MMi (flat plates) of the memory medium are prepared beforehand. As shown in FIG. 15B, a three-dimensional memory medium MM is produced by stacking a plurality of slices. According to this embodiment, it is possible to previously write data every slice MMi and then assemble them as the MM. For example, it is also possible to produce a memory medium MM by previously producing slices MMi with wafers such as silicon which transmits infrared rays, opening through holes in desired memory cell locations in slices MMi, embedding a material which is harder to transmit infrared rays than the wafer material in the through holes, then stacking them, and sticking them to each other. In the present embodiment, data can be written every slice beforehand. When a large amount of memory media MM are produced, therefore, it is possible to lower the price.

By the way, if the slices are stacked with a shading material between slices to intercept stray light, there is a merit that light can be shut off at the time of reading and reading can be conducted more accurately.

Figure 16:
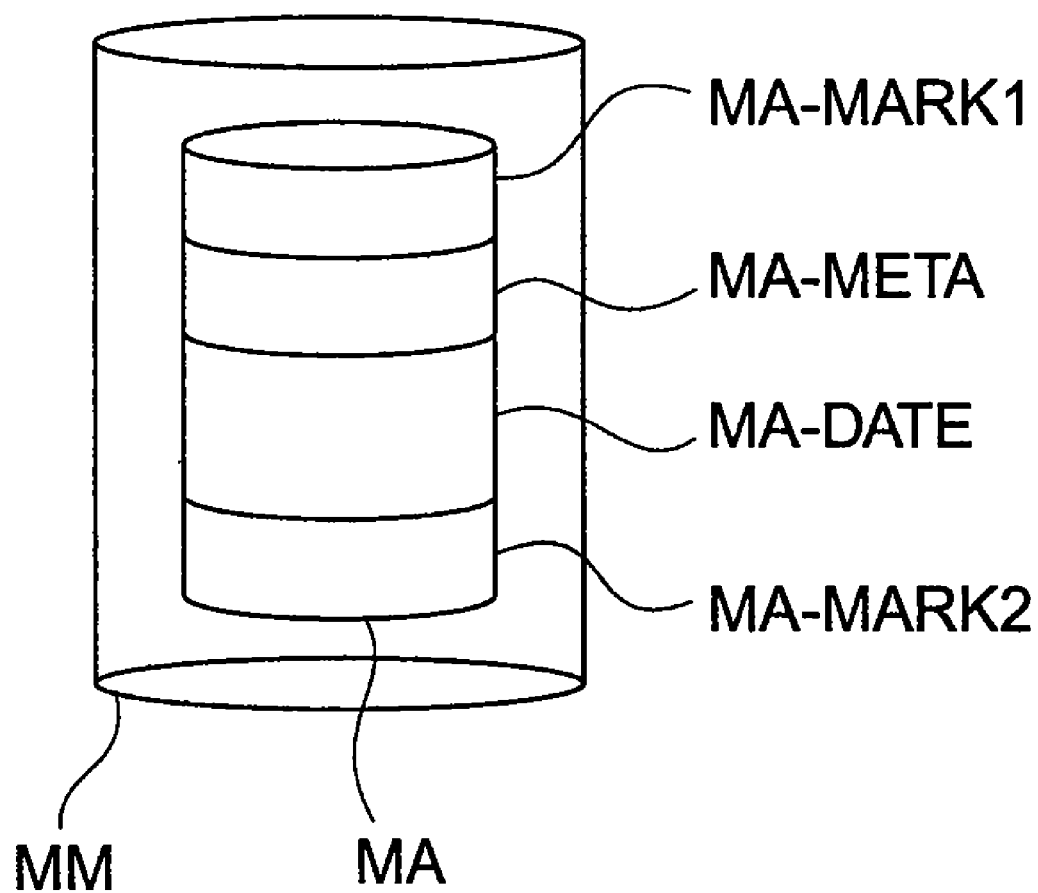
FIG. 16 shows a first embodiment of contents of the memory medium used in the present invention.

An embodiment concerning a data configuration in the memory area MA will now be described with reference to FIG. 16. In the present embodiment, not only data but also information such as laying upon marks and meta data is stored. In the present embodiment, the memory area MA is divided into four parts. The four parts are MA-MARK1, MA-META, MA-DATA and MA-MARK2. Each part is formed of a plurality of layers as occasion demands. MA-MARK1 denotes a first laying upon mark area. MA-META denotes a meta data area. MA-DATA denotes a data area. MA-MARK2 denotes a second laying upon mark area. If an area which has no data and which is formed of one layer to several layers is provided in a boundary part between the four areas, then the boundary becomes definite and errors at the time of processing decrease. The laying upon mark areas MA-MARK1 and MA-MARK2 are parts having marks recorded thereon to detect the rotation angle and the movement quantity when rotating the memory medium or moving the memory medium up or down as occasion demands. Not only the mark of the origin for rotation and moving up or down, but also data for conducting the reading more accurately, such as a test pattern of several layers, is written beforehand. It becomes possible to cause accurate operation by feeding back information from these marks to a drive system such as a servo motor when rotating and moving up or down the memory medium MM.

It is desirable to record patterns useful for setting a dynamic range of a signal quantity at a reading time point, such as a layer having '1' on its whole face and a layer having '0' on its whole face, in the test patterns. The life of the medium can also be predicted by observing degradation of these test patterns.

The reason why two laying upon marks are provided is that established false operations can be decreased by correcting the influence of deviation of coordinates at the time of writing and aberration of the lens at the time of reading at both ends of the memory area. It is a matter of course that multiple laying upon marks may be provided as occasion demands. The laying upon marks may be provided within the memory medium MM. Alternatively, the laying upon marks may be stamped on the surface of the memory medium to facilitate recognition, and the laying upon marks may be recognized by using a lens or an imaging device dedicated to laying upon mask recognition. Especially as for marks for controlling the rotation angle, the precision is improved by providing the marks on the surface or near the surface of the memory medium to make the distance between marks large.

The meta data area MA-META is a part used to record not only an outline such as an author and a title of data recorded in the data area MA-DATA, but also information, such as a code, error correction or a compression method, required to reconstruct original data from a bit string found on the basis of computer tomography. Information in the meta data area MA-META should be represented by using a simple code or a code which makes it possible to make out the meaning directly from the bit string, as occasion demands so as to avoid that the information cannot be read out after preservation of data over a long period of time. If so, it becomes possible to make out the meta data when construction of a section image using computer tomography has proved successful. Therefore, it is possible to avoid situations where data cannot be read because the code of the data part is not clear after preservation over a long period of time such as several tens years or several hundreds years.

Figure 17A:
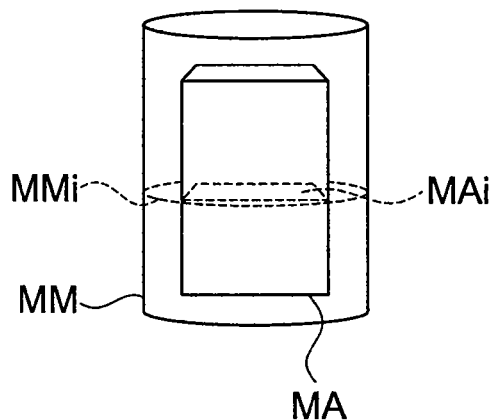
FIGS. 17A, 17B and 17C show a fourth embodiment of the structure of the memory medium used in the present invention.
Figure 17B:
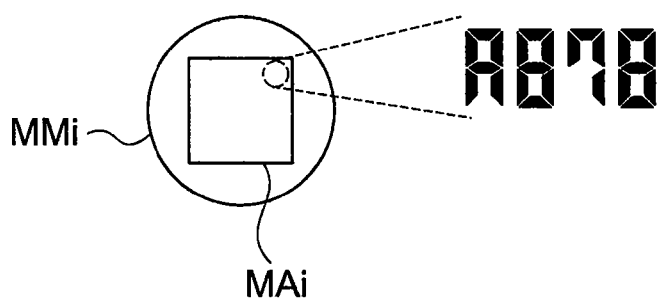
Figure 17C:
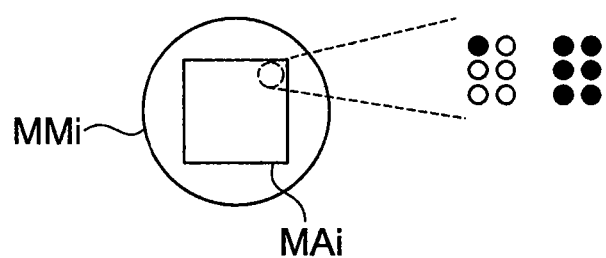

FIGS. 17A, 17B and 17C show an embodiment of a data pattern which makes it possible to simply make out contents of stored data when a section image is obtained by using the computer tomography. This data pattern is suitable not only for the storage of meta data as described above, but also for storage of data itself if the data should be preserved over a long period of time such as several hundreds years. If the data itself is preserved by using this form, the risk of becoming impossible to make out is lowered.

As shown in FIG. 17A, the memory medium MA takes the shape of a rectangular solid. By doing so, one obtained section image can be handled as if it is a compound printed on paper of one page. This results in an advantage that the section image is intuitive and intelligible.

In a data format shown in FIG. 17B, one alphanumeric character is represented by using seven short straight lines. As evident from FIG. 17B, this is a character form well used in display using a liquid crystal display or an LED (light-emitting diode display). Therefore, details will be omitted. For example, 8 is represented by using all sides. If the bottom side is not used, a character A can be used. Although short straight lines are used in FIG. 17B, a shape of one alphanumeric character can be represented by seven dots arranged to form the character 8. If the spacing between characters is provided as shown in FIG. 17B, it is easy to reproduce alphanumeric characters from the section image.

FIG. 17C shows an embodiment using Braille for blind persons use. This is a kind of phonogram represented by using six dots. Since six dots are used, the data quantity decreases slightly as compared with the example shown in FIG. 17A.

Besides, a 1-byte code or 2-byte code can be used to represent a character. Although it cannot be made out intuitively as compared with the embodiments shown in FIGS. 17B and 17C, it is generally spread. Even if preservation over a long period of time is conducted, therefore, the probability of being capable of making out it is high.

As for photographs and drawings as well, the compressed code may be used. Although use of a bitmap increases the data quantity, however, it facilitates making out. Therefore, they can be used properly according to the purpose. It is also useful to preservation of data over a long period of time to indicate correspondence between a data form which can be made out intuitively and a data code used to preserve the data, in the meta data part.

Figure 18A:
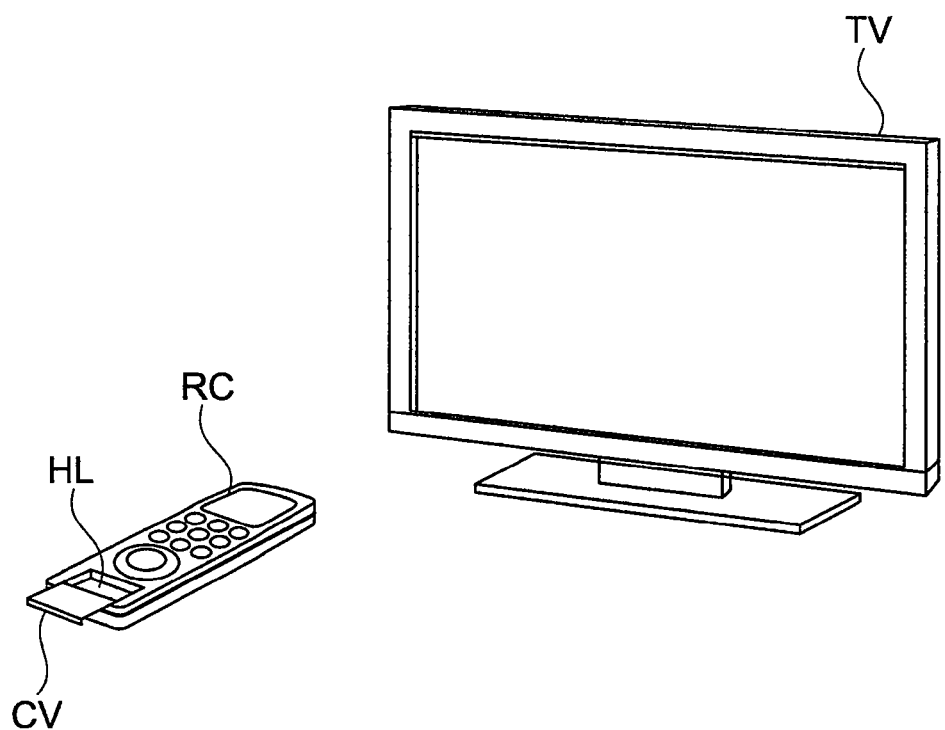
FIGS. 18A and 18B show an embodiment in which an information memory apparatus according to the present invention is incorporated in a television remote controller.
Figure 18B:
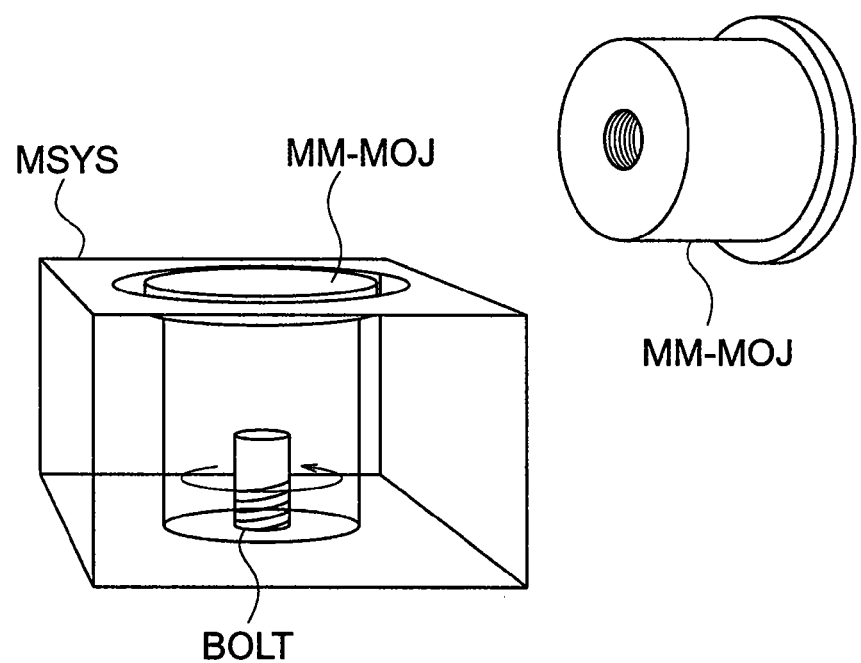

The information memory apparatus according to the present invention can be incorporated into various systems. FIGS. 18A and 18B show embodiments in which the information memory apparatus is incorporated into a television set. FIG. 18A shows a television TV which displays a broadcasting program or a recorded video, and a remote controller RC for controlling the television TV. An information memory system MSYS according to the present invention is incorporated into the remote controller RC. A cover CV shown in FIG. 18A is opened, a memory medium module MM-MOJ is inserted into an insertion hole HL of the information memory system MSYS and fixed to a rotation bolt BOLT, and the cover CV is closed. Subsequently, if the remote controller RC is operated, then data stored in the memory medium module MM-MOJ is read by the internal information memory system MSYS on the basis of the present invention. And a result can be transferred to the television set TV and enjoyed as an image and a voice. As a matter of course, it is also possible to add an image recording function by adding the writing unit shown in FIG. 4. Although the embodiment in which the information memory system MSYS is incorporated into the remote controller RC has been shown here, it is a matter of course that the information memory system MSYS may be incorporated into the television set TV. In the case where the information memory system MSYS is incorporated into the remote controller RC, there is a merit that it is not necessary to walk to the television set TV when exchanging the memory medium. On the other hand, in the case where the information memory system MSYS is incorporated into the television set TV, a large-sized information memory apparatus can be incorporated and it becomes possible to conduct reproduction and image recording over a long time by using one memory medium.

In the present invention, data are sealed in the memory medium MM as heretofore described. Readout can be conducted without contact. In other words, according to the present invention, the data part is not in direct contact with the air. If data are preserved in a case which intercepts light, therefore, data are not lost at a normal temperature and humidity. If the surface should be cracked or eroded by mold or the like, information can be read out by polishing that part. Therefore, the information memory apparatus according to the present invention is suitable for preserving data of precious videos, documents, or cultural assets as digital data over a very long period. Although microfilms are mainly used for long-term preservation of books and documents at the present time, this is duplicated analog data and assumes two values of black and white. Although optical disks, hard disks or semiconductor memories can store digital data at high density, they are far behind the microfilms (which are said to be at least 500 years) in life. In this way, the present invention has not only a feature of high density storage using three-dimensional storage but also a feature of making possible preservation of digital data over a long period of time which has not been realized until now.

Heretofore, the present invention has been described with reference to concrete embodiments. It is a matter of course that the present invention is not restricted to them and various modifications are possible. In the drawings, there are also parts in which the curvature of the lens or various dimensions are simplified so as to be easily understandable or which are depicted with deformation. Those who have ordinary knowledge of engineering can design to have suitable values on the basis of the spirit of the present invention from the drawings and description of the embodiments.

Finally, main variations and points to be noted in actually designing the information memory apparatus according to the present invention will now be described.

First, as for the shape of the memory medium MM, the cylinder is used in the embodiments. However, it is also possible to use a rectangular solid or a prism for reasons of design. In this case, there is an advantage that the memory medium MM is harder to roll as compared with the cylinder when it is place on, for example, a desk. If X-rays are used, the shape of the memory medium MM can be selected freely to some extent because the property of going straight on is intense. In embodiments using rays other than X-rays as well, however, it is possible to adopt a medium having a shape other than the cylinder as the memory medium MM.

For implementing such a variation in the embodiment shown in FIG. 11, a hole taking the shape of a prism should be opened in the cylindrical memory medium MM shown in FIG. 11. If so, it becomes possible to insert an MM taking the shape of a prism into the hole and use it.

In the case of the structure in which light is irradiated from the side to a part where the memory medium is inserted into the hole as shown in FIG. 2 or 4 or as in the above-described example of the prism, a disorder is caused in the image by reflection at the boundary or an insufficient precision in some cases. The disorder can be reduced by filling the boundary with an oily liquid having a refractive index close to that of the medium. Doing so reduces the influence of a little insufficiency of the face precision or cracks.

In the embodiment shown in FIGS. 15A and 15B, slices are stacked to form a memory medium. Besides this, various shapes can be adopted. For example, a shape of a memory medium made cylindrical by winding a sheetlike medium is shown in FIG. 3 in JP-A-2006-31894. It is also possible to apply such a shape to the memory medium MM in the present invention. In that case, there is an advantage that writing can be conducted easily because writing can be conducted in the state of a two-dimensional sheet beforehand.

As for the material of the memory medium MM, it is a matter of course that an organic matter other than glass, metal, semiconductor and their compound may be used. Basically, the material should be selected from among materials which have a property of transmitting light having wavelengths respectively utilized at the time of reading and writing, by considering the mechanical strength and durability. For example, when infrared rays are used, it is also possible to use silicon instead of glass.

A measure to counter the lens aberration will now be described. In the drawings of the embodiments, the collimator lens for reading and the object lens for writing are depicted as a single lens for intelligibility. When the aberration of the lens poses a problem, however, it is a matter of course that the aberration is conducted by combining lenses which differ in shape or material instead of a single lens. If the cylindrical memory medium MM itself is used as the collimator lens as in FIGS. 11 to 13, then it can be avoided to use light transmitted by the peripheral part of the cylinder by disposing the memory area MA near the center of the memory medium MM. As a result, it becomes possible to suppress the spherical aberration to some extent.

In the foregoing embodiments, there is an embodiment in which a lens is utilized between the light source and the memory unit MU or between the memory unit MU and the imaging chip CH. Furthermore, It is described that a lens should be used in the writing unit WU described with reference to FIG. 4 to cause the laser beam to become a fine beam.

As a matter of course, they can be realized even if reflecting mirrors having a metal film evaporated on the surface of glass are utilized instead of the lenses. As the metal film, aluminum is used ordinarily. In the case where infrared rays are handled, gold which is high in reflectance for infrared rays is used. In this way, a suitable metal film is evaporated according to the wavelength of utilized light. In addition, if necessary, a protection layer of silicon dioxide ($SiO_2$) or the like should be evaporated to protect a thin metal film. Although individual cases will not be described, various modifications are possible in the case of the reflecting mirrors as well. For example, a reflecting mirror having a concave surface or a convex surface, or a circular or bar-shaped reflecting mirror is used, or the size of the apparatus is made small by utilizing a plane mirror to fold back the light path. In the reflecting mirror, there is no chromatic aberration in principle. In the case where the light of the light source is not monochromatic light as well, it is possible to eliminate the influence of chromatic aberration. In the case where a white light source is used or a light source containing light of a plurality of wavelengths is used as the light source, therefore, there is an advantage that the cost can be lowered as compared with the case where lenses are used. When a concave mirror is used as the collimator lens, strictly speaking it is necessary to utilize the so-called paraboloidal mirror having a parabolic section. When using a mirror having a focal length which is longer than its aperture, however, manufacturing is facilitated and the cost can be further reduced by using a spherical mirror instead.

The light source utilized in the reading unit is now mentioned. So long as light of the utilized wavelength is contained, the general incandescent electric lamp or light emitting diode may be used, or a xenon lamp or a mercury lamp which can provide stronger light may be utilized. If infrared rays, ultraviolet rays or X-rays are necessary, it is a matter of course that a light source corresponding thereto should be selected. By the way, a laser may also be used as long as rays which cover the whole of the memory medium MM in the x-direction can be emitted.

The above-described embodiments are premised on that there are a large number of minute areas called memory cells in the memory area MA and data is represented depending upon whether the optical transmissivity in that part is large or small. For changing the optical transmissivity in each minute area, there is also a method of causing heat denaturation in the whole part. However, the transmissivity in the whole minute area may be controlled by generating a plurality of minute points which does not transmit light within the minute area. As for such a 'point', there is also a method of producing the memory medium MM from glass and forming minute cracks by using the laser. Or a matter group which is denatured by heat and called phase change material may also be used. A matter which is changed in an optical property such as transmissivity by heat should be selected from among these matters. Since it is sufficient in computer tomography that projection images are obtained, it is sufficient that an integral value of light quantity along the light path passing through the memory area MA is obtained. Therefore, it is not always necessary to utilize the transmissivity simply. For example, in an alternative embodiment, a matter which causes a light emission phenomenon to emit, for example, phosphorescence is mixed uniformly into the memory area MA beforehand, and excitation required for light emission, such as laser beam irradiation or voltage applying, is conducted at the time of reading. Thus, projection images based upon light emission in the memory area MA are obtained. As a result, it is also possible to apply the computer tomography in the same way as transmitted light. By the way, writing can be conducted by focusing laser rays in a desired memory cell part, thereby denaturing the light emission matter by heat, and degrading the light emission characteristics. In other words, each bit can be represented by whether light emission strength is lowered by degradation. As the material which causes light emission, a metallic oxide or the like can be used.

The embodiments of the present invention have been described supposing that the memory medium MM is caused to make at least one revolution for computation of the computer tomography. However, it is possible to raise the signal-to-noise ratio of imaging data by increasing the number of revolutions and thereby taking a large number of images. If imaging is conducted while changing the angle by a very fine angle during one revolution, it is difficult to raise the revolution precision in some cases. If in such a case the rotation velocity and imaging interval are adjusted suitably by using a motor which rotates at a constant velocity, then it becomes possible to take projection images which differ minutely in angle by using data obtained by imaging in a plurality of revolutions.

According to the present invention, preservation of data over a long period of time can be anticipated as described earlier. This is because the data memory area MA is hermetically sealed in the memory medium MM as described earlier. For further developing the characteristics, a method of attaching a cover to intercept light or coating the surface of the memory medium to cut rays other than light used for readout is effective when preserving the memory medium.

It is a matter of course that means of housing the apparatus in a receptacle to intercept external light or providing an aperture or a slit to prevent stray light from entering the imaging device can be applied to raise the signal-to-noise ratio at the time of reading. However, the signal-to-noise ratio can be further raised by using a blinking light source together. When taking a projection image at a certain rotation angle, the reading light source RLS is chopped with a proper constant period, the shutter of the imaging device is activated in synchronism with the chopping to conduct multiple exposure, and the projection images are integrated. By doing so, the influence of stray light which changes with a period different from that of the reading light source can be made very small. In addition, if the so-called dark noise of the imaging device is taken as an image in situations where the light source is turned off and subtracted, then it becomes possible to remove almost all of the influence of DC noise as well and reading with a high signal-to-noise ratio becomes possible.

In the embodiments, examples of reading using light or X-rays have been shown. However, particle rays such as electron rays can also be used. Since in that case the wavelength is short, microstructures can be read, and the recording density can be raised by making the memory cells finer.

Furthermore, if the high speed imaging method developed mainly in image diagnoses of human bodies, such as the helical scan, is applied, then it is a matter of course that it is useful to conduct reading from a memory area which is larger than the imaging device at high speed.

In the present invention, the following methods are effective in reproducing serial data such as music, videos or reading aloud of novels. A first method is a method of causing the memory medium MM to make one revolution, taking data of all projection images in a semiconductor memory apparatus or the like, and reproducing data of a slice section in the z-direction while changing the value of the z-coordinate. A second method is a method of taking in only slice data at one z-coordinate value by conducting imaging once and reproducing slice data finished in image taking, successively. The first method has a merit that the drive power is low, because the memory medium is required to make one revolution if a memory device which stores imaging data corresponding to one revolution can be prepared. In the second method, an image of only one slice is taken in one revolution. For reproducing the whole, therefore, as many revolutions as the number of slices are needed. However, only a memory device which stores imaging data corresponding to two slices, i.e., slice data to be obtained by image taking hereafter and slice data obtained by image taking last time is needed. Therefore, the second method has an advantage that the cost of the apparatus can be made low.

Heretofore, invention made by the present inventor has been described concretely on the basis of the embodiments. As a matter of course, however, the present invention is not restricted to the embodiments, but various changes can be made without departing from the spirit of the invention.

The information memory apparatus according to the present invention makes it possible to improve the memory density by arranging memory cells three-dimensionally. Furthermore, since the memory area MA is sealed within the memory medium MM, digital data can be stored over a long period of time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information memory apparatus comprising:
an illumination unit including a light source;
a memory unit including a memory medium, the memory medium having a memory area, a plurality of memory cells being arranged in the memory area, each of the memory cells storing data using a difference in transmissivity for light rays irradiated from the illumination unit or a difference caused in light emission characteristics when light rays irradiated from the illumination unit have been received;
a reading unit having an imaging device to take an image of light rays incident via the memory medium; and
a computation unit for analyzing data obtained by taking an image in the reading unit,
wherein light rays irradiated from the illumination unit has a width covering the memory area in the memory medium in a direction of a third axis perpendicular to a first axis coupling the illumination unit and the reading unit and a rotation axis of the memory medium.

2. The information memory apparatus according to claim 1, wherein the light rays irradiated from the illumination unit are light rays parallel to the first axis in the memory medium.

3. The information memory apparatus according to claim 2, wherein
the illumination unit has a collimator between the light source and the memory unit, and
the collimator converts the light rays irradiated from the light source to light rays which are parallel to the first axis.

4. The information memory apparatus according to claim 1, wherein the memory medium takes a shape of a cylinder having a height in a direction of the rotation axis of the memory medium.

5. The information memory apparatus according to claim 4, wherein
the memory unit further comprises a support medium, and the support medium has a hole in which the memory medium is disposed, and
the support medium takes a shape of a prism having a surface parallel to the rotation axis and the third axis.

6. The information memory apparatus according to claim 5, wherein
the memory unit has a fluid between the memory medium and the support medium, and
an absolute value of a difference between a refractive index of the support medium and a refractive index of the fluid is less than an absolute value of a difference between the refractive index of the support medium and a refractive index of air, and an absolute value of a difference between a refractive index of the memory medium and the refractive index of the fluid is less than an absolute value of a difference between the refractive index of the memory medium and the refractive index of the air.

7. The information memory apparatus according to claim 1, wherein
a size of the light rays irradiated from the illumination unit in the memory medium in a direction of the rotation axis is smaller than an area where the memory cells are arranged in the direction of the rotation axis, and
the memory medium moves in the direction of the rotation axis.

8. The information memory apparatus according to claim 1, wherein
the information memory apparatus further comprises a writing unit for writing information into the memory cells, and
the writing unit includes a light source for irradiating a laser beam and a lens for controlling a focus of the laser beam.

9. The information memory apparatus according to claim 1, wherein the light rays irradiated from the illumination unit have a wavelength of ultraviolet rays or a wavelength longer than the wavelength of ultraviolet rays.

10. The information memory apparatus according to claim 1, wherein the light rays irradiated from the illumination unit are X-rays.

11. The information memory apparatus according to claim 1, wherein
the memory medium takes a shape of a cylinder having a height in the direction of the rotation axis, and
the information memory apparatus further comprises a collimator between the memory unit and the reading unit to convert the light rays irradiated via the memory medium to light rays parallel to the first axis.

12. The information memory apparatus according to claim 1, wherein
the memory medium takes a shape of a cylinder having a height in the direction of the rotation axis, and
the reading unit has a mask to intercept a part of light rays irradiated via the memory medium.

13. The information memory apparatus according to claim 1, wherein the memory cells are arranged three-dimensionally by stacking patterns each arranged on a plane formed by the first axis and the third axis, in a direction of the rotation axis.

14. The information memory apparatus according to claim 13, wherein
the memory medium takes a shape of a cylinder having a height in the direction of the rotation axis, and the memory cells are arranged on radial lines extending from a center of the cylinder on each plane formed by the first axis and the third axis.

15. The information memory apparatus according to claim 13, wherein
the memory medium takes a shape of a cylinder having a height in the direction of the rotation axis, and
the memory cells are arranged on concentric circles around a center of the cylinder on each plane formed by the first axis and the third axis.

16. The information memory apparatus according to claim 13, wherein an interval between the memory cells is at least twice a wavelength of the light rays irradiated from the illumination unit.

17. The information memory apparatus according to claim 13, wherein an interval of the memory cells in the direction of the rotation axis is greater than an interval of the memory cells on each plane formed by the first axis and the third axis.

* * * * *